(12) United States Patent
Orehek

(10) Patent No.: US 11,679,321 B1
(45) Date of Patent: Jun. 20, 2023

(54) CUSHIONED TRACTION PADS FOR SELF-BALANCING VEHICLES

(71) Applicant: Paul Orehek, Pebble Beach, CA (US)

(72) Inventor: Paul Orehek, Pebble Beach, CA (US)

( * ) Notice: Subject to any disclaimer, the term of this patent is extended or adjusted under 35 U.S.C. 154(b) by 27 days.

(21) Appl. No.: 17/313,935

(22) Filed: May 6, 2021

Related U.S. Application Data

(63) Continuation of application No. 16/840,104, filed on Apr. 3, 2020, now Pat. No. 11,045,712, which is a continuation-in-part of application No. 16/375,680, filed on Apr. 4, 2019, now Pat. No. 10,717,490.

(51) Int. Cl.
*A63C 17/08* (2006.01)

(52) U.S. Cl.
CPC .......... *A63C 17/08* (2013.01); *A63C 2203/42* (2013.01)

(58) Field of Classification Search
CPC ...... B62K 11/007; B62D 51/02; B62D 37/00; B63B 35/79; B63B 35/7906; B63B 35/7936; A63C 5/00; A63C 5/03; A63C 5/003; A63C 5/06; A63C 5/124; A63C 17/01; A63C 17/017; A63C 17/08; A63C 2203/42
See application file for complete search history.

(56) References Cited

U.S. PATENT DOCUMENTS

| | | | | |
|---|---|---|---|---|
| 5,766,051 A * | 6/1998 | Messer | ............... | A63C 5/06 441/65 |
| 6,767,264 B2 * | 7/2004 | Mercer | ............... | B63B 32/45 441/65 |
| 9,604,692 B1 * | 3/2017 | Kim | ............... | B62D 51/02 |
| 9,707,470 B2 * | 7/2017 | Ma | ............... | B62K 1/00 |
| 9,968,841 B2 * | 5/2018 | Doerksen | ............... | A63C 17/26 |
| 10,058,765 B2 * | 8/2018 | Ma | ............... | B62K 11/007 |
| 10,421,006 B1 * | 9/2019 | Li | ............... | A63C 17/011 |
| 10,625,141 B2 * | 4/2020 | Li | ............... | B62J 43/16 |
| 10,661,153 B2 * | 5/2020 | Ma | ............... | A63C 17/12 |
| 10,682,565 B1 * | 6/2020 | Woolson | ............... | A63C 17/08 |
| 10,696,347 B2 * | 6/2020 | Ying | ............... | B62K 17/00 |
| 10,696,348 B2 * | 6/2020 | Ying | ............... | B62K 3/002 |
| 10,717,490 B1 * | 7/2020 | Orehek | ............... | A47G 27/0231 |
| 10,730,577 B2 * | 8/2020 | Chen | ............... | B62K 11/007 |
| 11,136,084 B2 * | 10/2021 | Shang | ............... | B62J 6/015 |
| 11,148,037 B2 * | 10/2021 | Ma | ............... | B62K 3/002 |
| 11,180,213 B2 * | 11/2021 | Ying | ............... | B62K 11/007 |

(Continued)

*Primary Examiner* — James M Dolak

(74) *Attorney, Agent, or Firm* — Knowmad Law; Christopher R. McElwain

(57) ABSTRACT

Method and apparatus directed to cushioned concave pads, cushioned traction pads, and/or grip tape for self-balancing vehicles. The method and apparatus includes front cushioned pads and/or front cushioned traction pads having top surfaces and bottom surfaces; attaching the bottom surfaces of the front cushioned pads and/or the front cushioned traction pads to a first deck portion disposed at a first end of a frame; selecting rear cushioned pads and/or rear cushioned traction pads having top and bottom surfaces. The top surfaces of the rear cushioned pads and/or rear cushioned traction pads can have a rear kicktail extending integrally upwardly and rearwardly. The method and apparatus further include attaching the bottom surfaces of the rear cushioned pads and/or the rear cushioned traction pads to a second deck portion disposed at a second end of the frame.

11 Claims, 26 Drawing Sheets

(56) References Cited

U.S. PATENT DOCUMENTS

| | | | | |
|---|---|---|---|---|
| 11,273,364 | B1* | 3/2022 | Doerksen | A63C 17/12 |
| 11,273,503 | B2* | 3/2022 | Walker, II | B62J 25/04 |
| 11,292,547 | B2* | 4/2022 | Cao | B62J 45/415 |
| 11,312,444 | B2* | 4/2022 | Ying | B62K 11/007 |
| 11,325,021 | B1* | 5/2022 | McCosker | A63C 17/12 |
| 11,358,050 | B2* | 6/2022 | Zang | B62K 11/007 |
| 11,427,278 | B2* | 8/2022 | Chen | A63C 17/04 |
| 11,433,294 | B2* | 9/2022 | Woolson | A63C 17/08 |
| 11,459,053 | B2* | 10/2022 | Ying | B62D 51/02 |
| 11,484,776 | B2* | 11/2022 | Doerksen | B62K 11/007 |
| 11,485,171 | B2* | 11/2022 | Liu | B62K 11/007 |
| 11,524,743 | B2* | 12/2022 | Ke | A63C 17/04 |
| 11,541,299 | B2* | 1/2023 | Doerksen | A63C 17/016 |
| 11,541,960 | B2* | 1/2023 | Ying | B62M 6/50 |
| 11,584,236 | B2* | 2/2023 | Doerksen | B62K 11/007 |
| 11,584,455 | B2* | 2/2023 | Pikulski | B62J 25/04 |
| 11,590,409 | B2* | 2/2023 | Doerksen | B62J 45/41 |

\* cited by examiner

CUSHIONED TRACTION PADS FOR SELF-BALANCING VEHICLES

PRIORITY CLAIM

This application is a continuation, claiming priority to co-pending U.S. Continuation-in-Part Utility application Ser. No. 16/840,104, entitled "Cushioned Concave Pads for Self-Balancing Vehicles" filed Apr. 3, 2020, and is entitled to the benefit of, and claims priority to Non-Provisional U.S. Utility application Ser. No. 16/375,680, entitled "Cushioned Traction Pads" filed Apr. 4, 2019; all of which are included by reference as fully set forth herein.

TECHNICAL FIELD

The present invention relates generally to pads for self-balancing vehicles, more particularly, to cushioned tractions pads and cushioned concave pads for self-balancing vehicles that have at least one wheel for movement.

BACKGROUND OF THE INVENTION

Self-balancing vehicles such as electric skateboards that have at least one wheel for travel/movement generally include first and second deck portions that are each configured to receive a left or right foot of a rider. The deck portions come with a flat grip tape 13 that is coarse for reducing rider slippage, and the deck portions are not cushioned for the feet of riders.

When in use, a user may want to ride the self-balancing vehicle barefoot or with socks if riding near a beach, park or a trail. The flat grip tape 13 makes it very uncomfortable for users to ride the self-balancing vehicle barefoot or with just socks because of the coarse surface. Further, the deck portion is comprised of a hard surface which also makes it very uncomfortable for a user to ride the vehicle barefoot for prolonged periods of time, with socks or even with just shoes.

Another problem with self-balancing vehicles such as the ONEWHEEL™ is that the stock grip tape 13 loses its traction and becomes slippery when debris is kicked up and thrown on top of the tape surface especially when riding off road. This problem often leads to the feet of users sliding on the foot pads and ultimately the problem of users losing control when riding the vehicle.

A further problem with self-balancing vehicles such as the ONEWHEEL™ is that a cushioned concave pad is needed that creates a padded saddle and/or leverage for a rider's heel and toes that allows the rider to have better control when riding especially in turns.

In light of the shortcomings in the prior art, there is definitely a need for an improved way of providing a user with a comfortable gripping foot surface and also a concave top surface for better foot leverage when riding a self-balancing vehicle.

SUMMARY OF THE INVENTION

The present invention relates to an improved way of providing a comfortable gripping/traction surface for the riders of self-balancing electric vehicles.

The present invention further relates to an improved gripping device that provides both sufficient traction to reduce rider slippage and cushioned features for user comfort.

Another aspect of the present invention is to provide cushioned traction pads that are lightweight for the users of self-balancing electric vehicles.

An additional aspect of the present invention is to provide cushioned traction pads that have protuberances for reducing rider slippage. The shape of the protuberances can be circular, triangular, square, pentagonal, hexagonal, diamond or combinations thereof.

A further aspect of the present invention is to provide front and rear traction pads that are cushioned and that include a sufficient gripping element disposed on the top portion of the traction pads for the rider's feet.

Another feature of the present invention is to provide traction pads that have a rear kicktail with beveled corners for further rider support. In other embodiments, the present invention provides sidekicks on the front traction pads for cradling and supporting the feet of riders.

An additional feature of the present invention is to provide front and rear cushioned traction pads that are comprised of lightweight ethylene-vinyl acetate foam (EVA foam).

A further feature of the present invention is to provide cushioned traction pads that come in a variety of colors and styles to fit the esthetic taste of individual riders.

One more feature of the present invention is to provide cushioned pads to users that have a concave top surface for providing better foot leverage and support when riding.

For a better understanding of the present invention, its functional advantages and the specific objects attained by its uses, reference should be made to the accompanying drawings, claims and descriptive matter in which there are illustrated embodiments of the invention.

DETAILED DESCRIPTION

Introduction

Figure 1A:
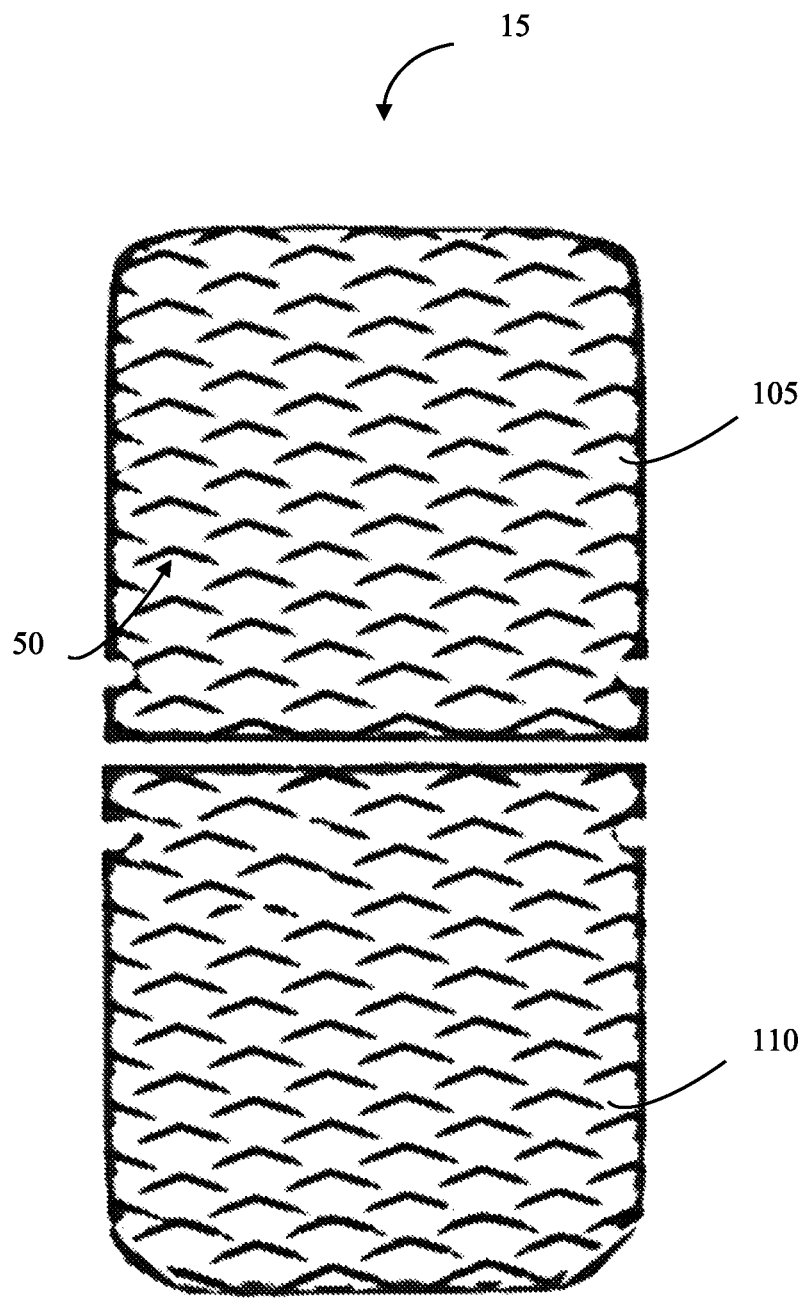
FIG. 1A shows front and rear cushioned traction pads.

The following detailed description is of the best currently contemplated modes of carrying out various embodiments of the invention in which said embodiments can be carried out independently and/or in combination. The description is not to be taken in a limiting sense but is made for at least the purpose of illustrating the general principles of the invention, since the scope of the invention is best defined by the appended claims.

In one embodiment, a pair of cushioned traction pads for a self-balancing vehicle is comprised of front and rear cushioned traction pads, each of the traction pads include a top surface and a bottom surface. The bottom surfaces of the front and rear cushioned traction pads are configured to be attached to first and second deck portions respectively. The top surfaces of the traction pads are configured to receive the left or right foot of a rider. The top surface of the rear cushioned traction pad also includes a rear kicktail extending integrally upwardly and rearwardly. In various embodiments, the front traction pad includes sidekicks for cradling the feet of riders.

In another embodiment of the present invention, a method provides for cushioned traction pads for self-balancing vehicles such as a ONEWHEEL™ vehicle. The method includes the steps of selecting front and rear cushioned traction pads; attaching the bottom surfaces of the cushioned traction pads to first and second deck portions disposed on a frame; attaching the bottom surfaces of the cushioned traction pads to the deck portion; and providing cushioned traction pads configured to receive the left or right foot of riders.

In various embodiments, a method and system of providing at least one cushioned concave pad for a self-balancing vehicle is provided. The method and system comprise the steps of providing a front cushioned concave pad to a user, the front cushioned pad having a top surface and a bottom surface, the bottom surface of the front cushioned pad is coupled to a first deck portion disposed at a first end of a frame, and the front cushioned pad includes a frontal end and a posterior end; providing a rear cushioned concave pad to the user, the rear cushioned pad having a top surface and a bottom surface, the bottom surface of the rear cushioned pad is coupled to a second deck portion disposed at a second end of the frame, and the rear cushioned pad includes a frontal end and a posterior end; and the front cushioned concave pad is disposed fore of a single wheel and the rear cushioned concave pad is disposed aft of the single wheel, the single wheel being substantially coupled to a middle section of the frame, wherein a first space is disposed between the single wheel and the posterior end of the front cushioned concave pad, and wherein a second space is disposed between the single wheel and the posterior end of the rear cushioned concave pad, thereby enabling the single wheel to rotate when in use.

DETAILED DESCRIPTION

It should be understood that the foregoing relates to various embodiments of the present invention which can be carried out independently and/or in combination and that modifications may be made without departing from the spirit and scope of the invention. It should be further understood that the present invention is not limited to the designs mentioned in this application and the equivalent designs in this description, but it is also intended to cover other equivalents now known to those skilled in the art, or those equivalents which may become known to those skilled in the art in the future.

Figure 6A:
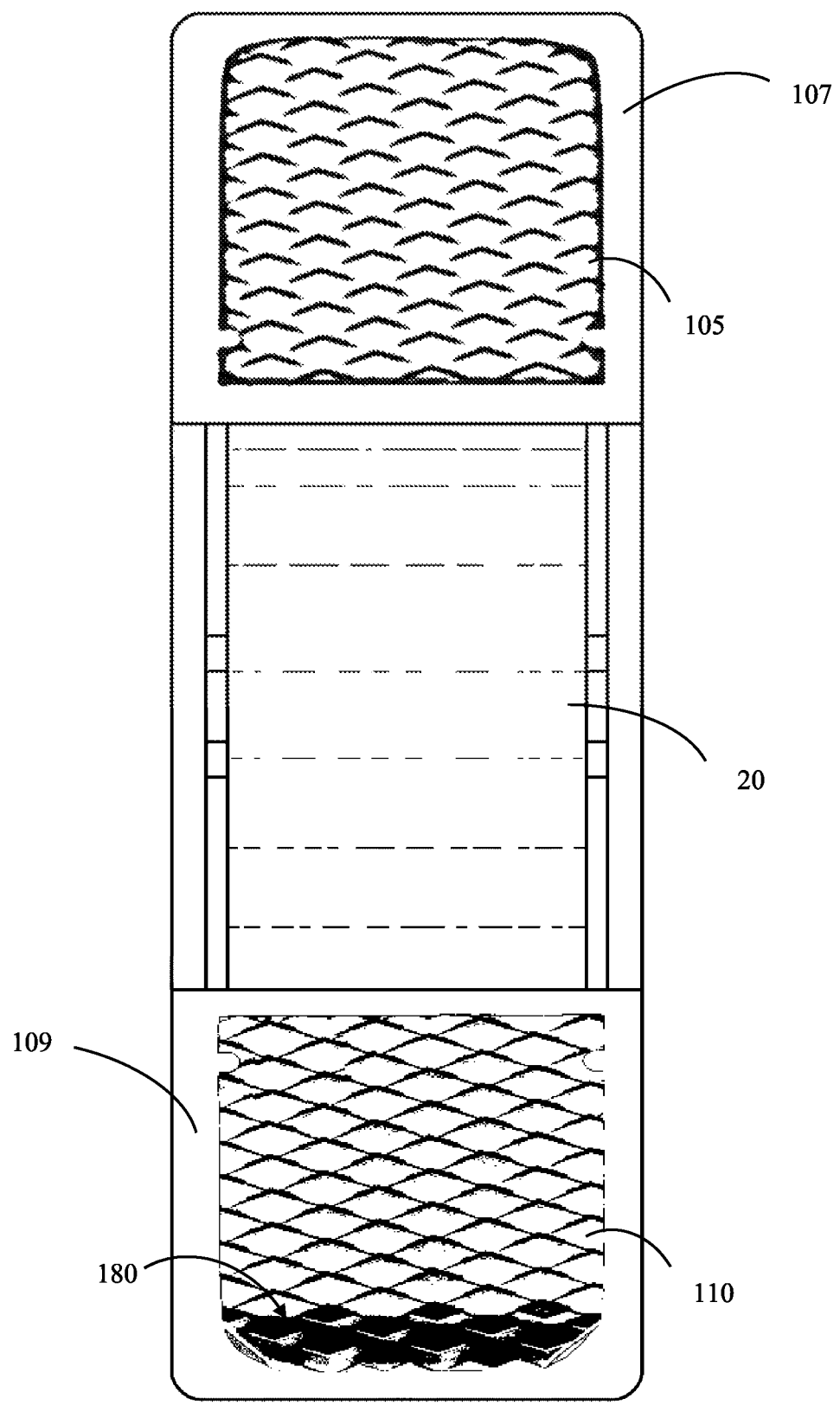
FIG. 6A represents a top view of a self-balancing vehicle having front and rear cushioned traction pads.
Figure 6B:
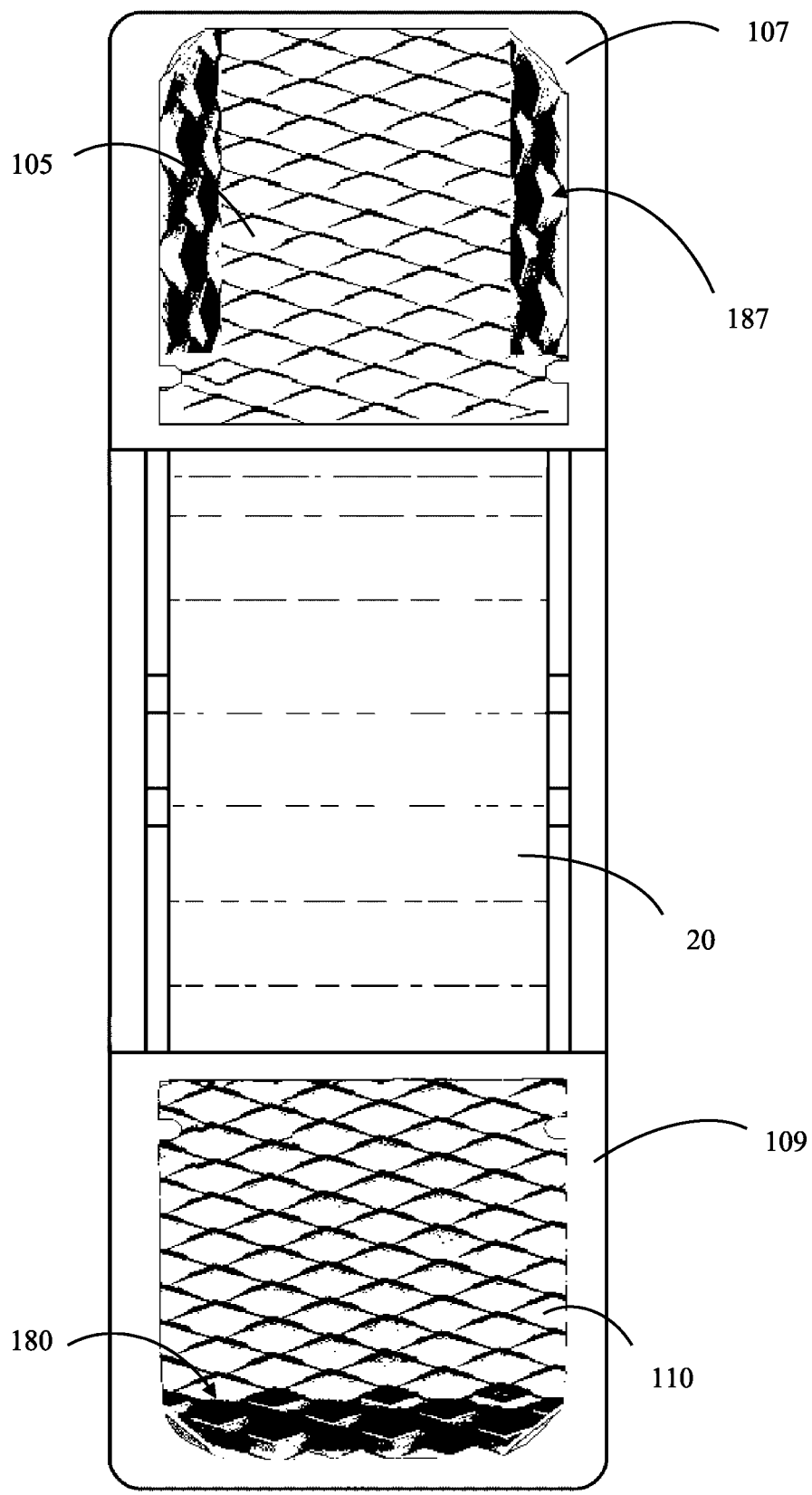
FIG. 6B represents another top view of a self-balancing vehicle.
Figure 6C:
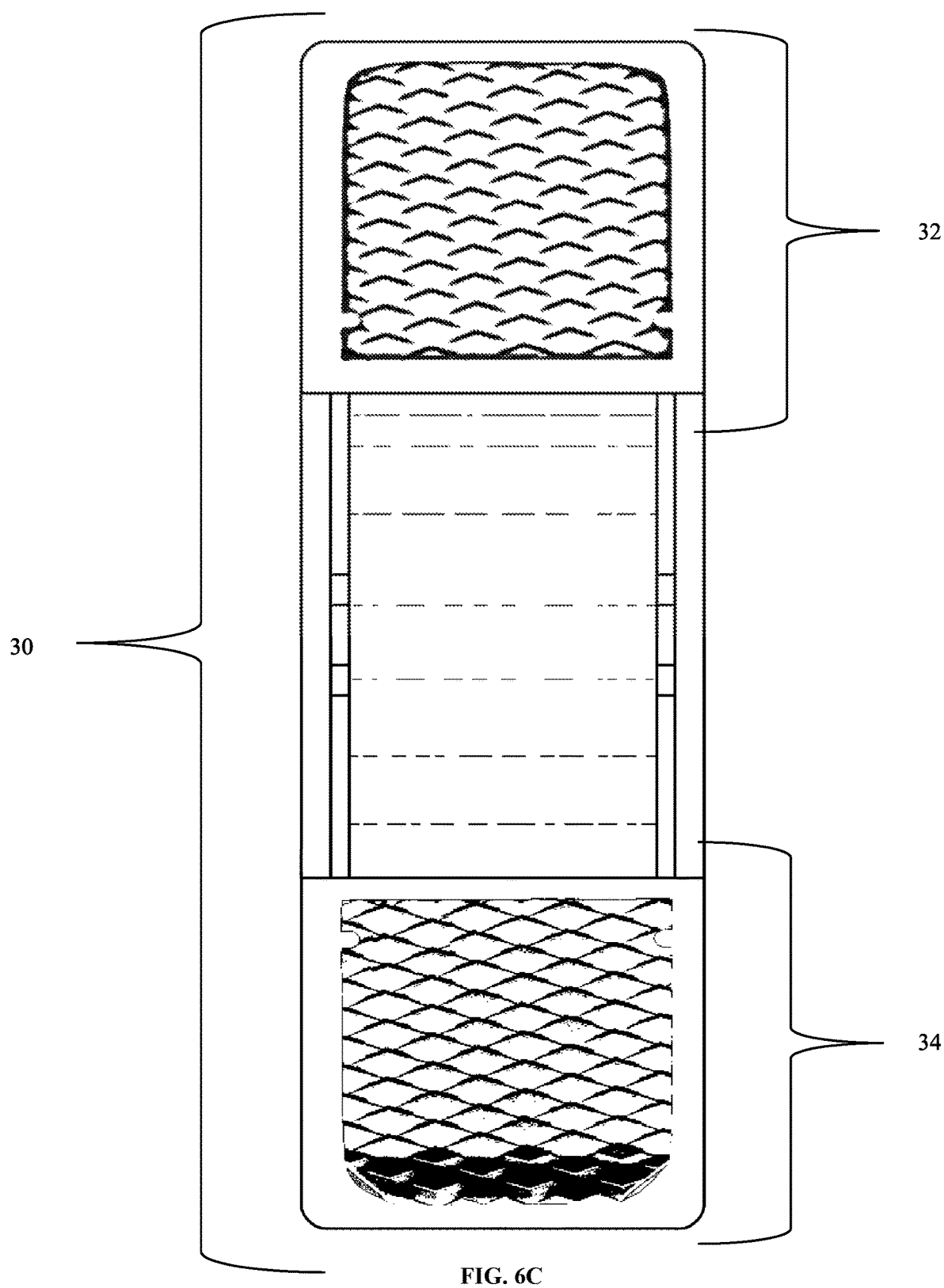
FIG. 6C represents a further top view of a self-balancing vehicle showing the frame of said vehicle.

With reference to FIG. 1A, one embodiment is depicted showing a pair of cushioned traction pads 15 (rectangular shaped having a width and length) for self-balancing vehicles 10 such as a ONEWHEEL™. The cushioned traction pads 15 include a front cushioned traction pad 105 having a top surface and a bottom surface 55 that includes an adhesive such as double coated tissue tape (See FIGS. 1D-1E). The bottom surface 55 of the front cushioned traction pad 105 is configured to be attached to a first deck portion 107 disposed at a first end 32 of a frame 30 as shown in FIGS. 6A-6C. The top surface of the front cushioned traction pad 105 is configured to receive a left or right foot of a rider.

Referring still to FIG. 1A, a rear cushioned traction pad 110 includes a top surface and a bottom surface 55. The bottom surface 55 of the rear cushioned traction pad 110 is configured to be attached to a second deck portion 109 disposed at a second end 34 of the frame 30 as shown in FIGS. 1D-1E and 6A-6C. The top surface of the rear cushioned traction pad 110 is configured to receive the left or right foot of the rider. Further, the top surface of the rear cushioned traction pad 110 advantageously includes a rear kicktail 180 extending integrally upwardly and rearwardly as shown in FIGS. 2A, 4, 5A-5B, 6A, 6B and 6C.

In various embodiments, the bottom surface of the friction pads includes an adhesive for adhering the bottom surfaces to the deck portions 107/109. The adhesive can be comprised of 3M double coated tissue tape (3M 9080A).

Figure 1B:
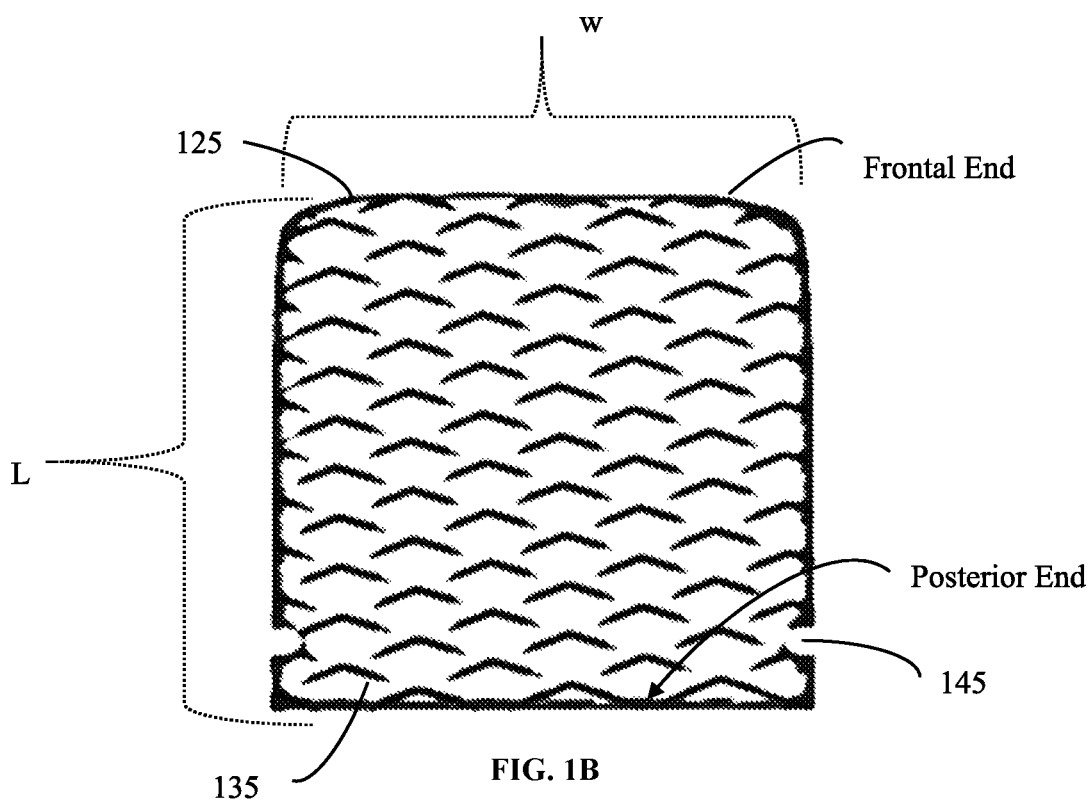
FIG. 1B shows a front cushioned traction pad.

As shown in FIG. 1B, the front cushioned traction pad 105 includes a first front end 125 and a first rear end 135. In one embodiment, a pair of notches 175 are disposed substantially at left and right sides of the first rear end 135 for allowing access to a coupling device 7 such as a screw or fastener for fastening the deck to the frame (See also FIGS. 4, 5A-5B).

Figure 1C:
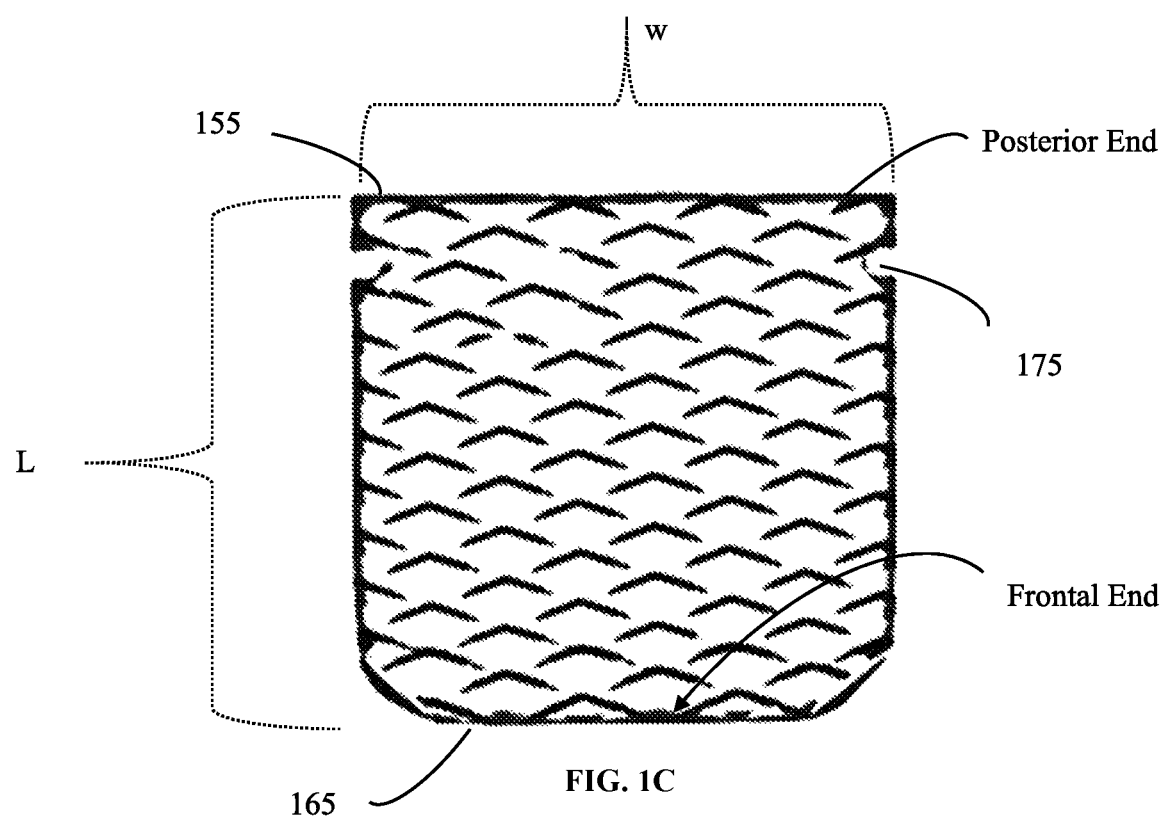
FIG. 1C shows a rear cushioned traction pad.
Figure 1D:
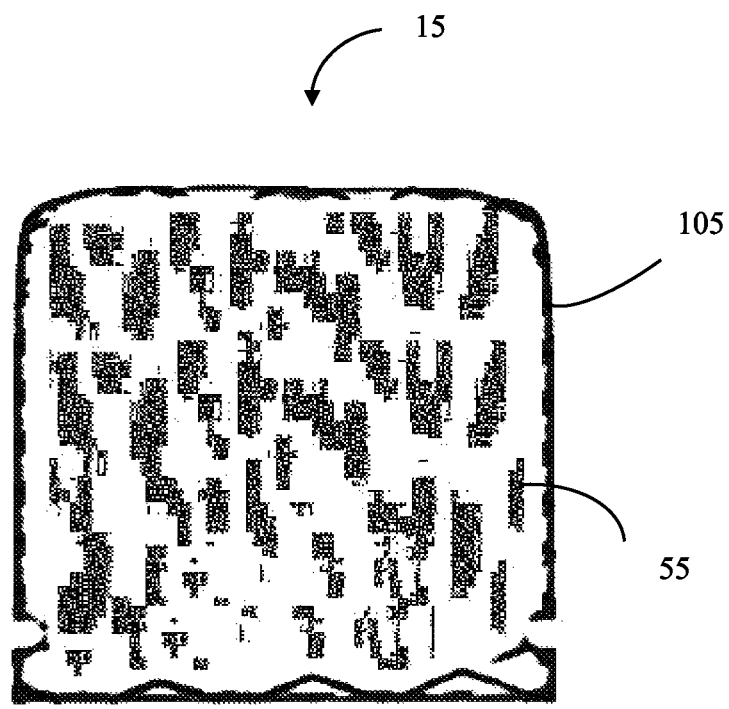
FIGS. 1D-1E show the bottom surface of the front and rear cushioned traction pads.
Figure 1E:
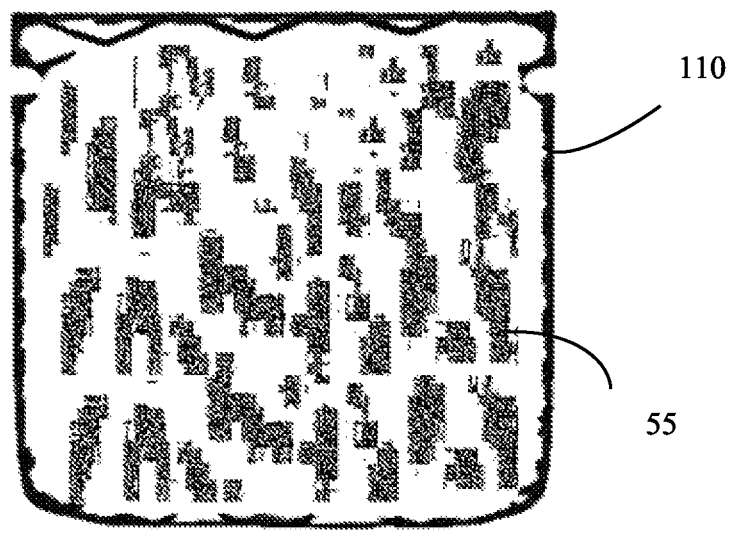

As shown in FIG. 1C, the rear cushioned traction pad 110 includes a second front end 155 and a second rear end 165. In various embodiments, a pair of notches 175 are disposed substantially at left and right sides of the second front end 155 for allowing access to a coupling device 7 such as screw or fastener for fastening the deck to the frame (See also FIGS. 4, 5A and 5B).

Figure 4:
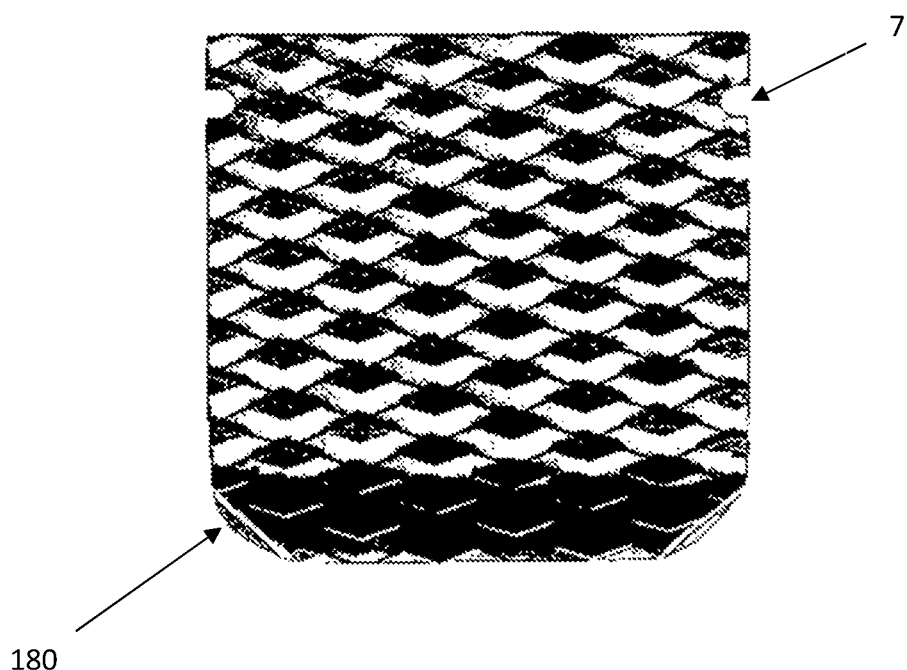
FIG. 4 represents another view of a rear cushioned traction pad having a kicktail.
Figure 5A:
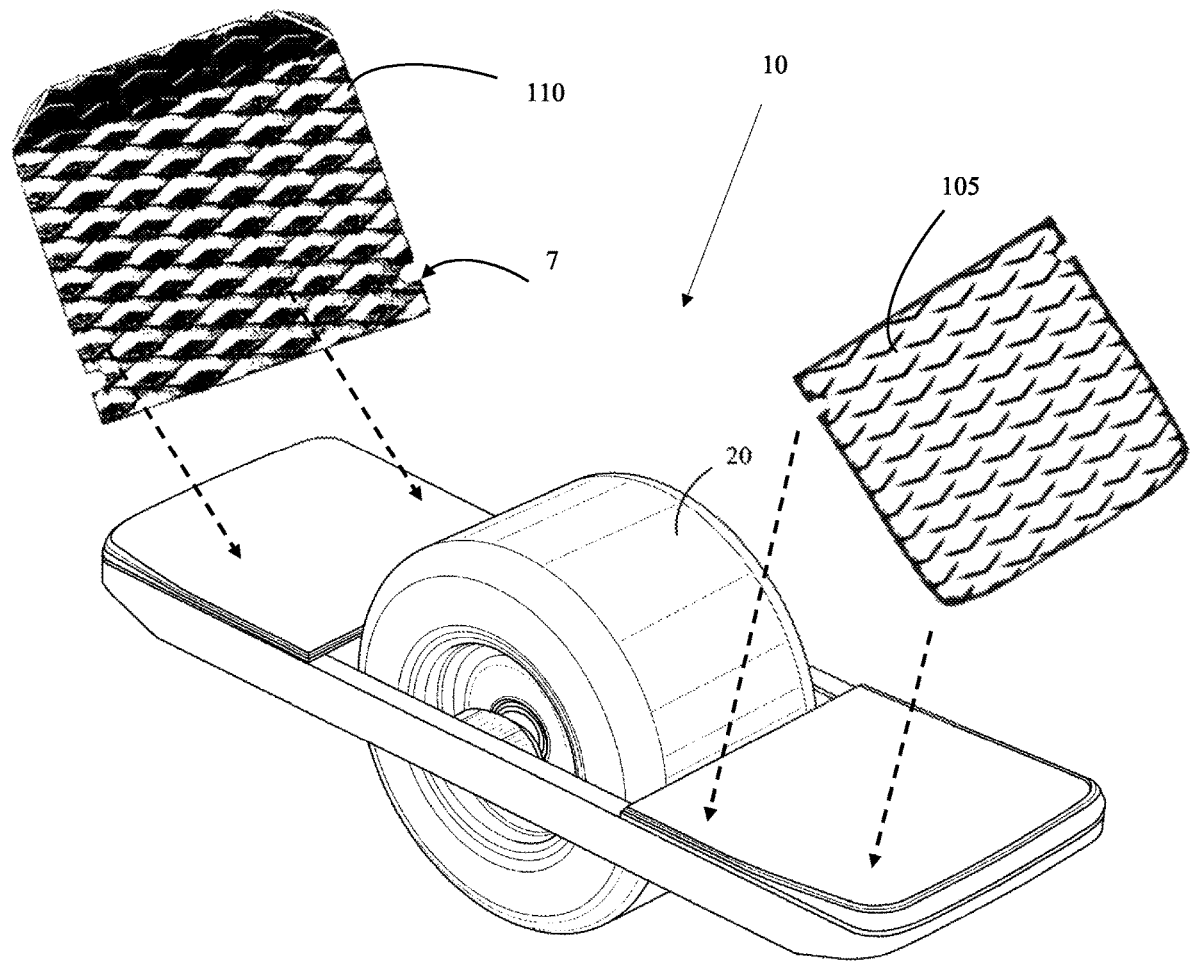
FIG. 5A represents a self-balancing vehicle.
Figure 5B:
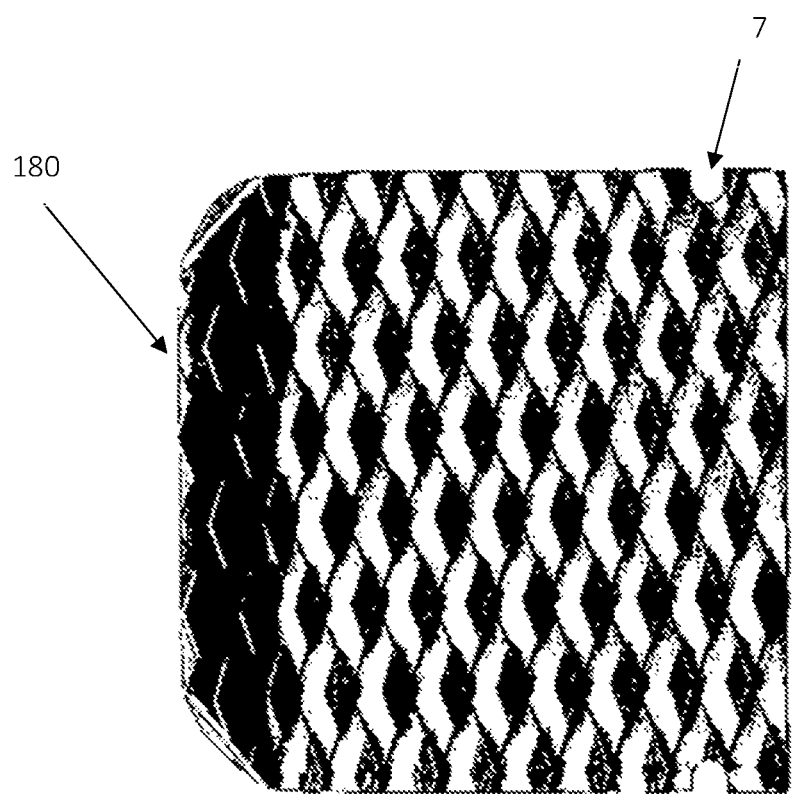
FIG. 5B shows an exploded view of the rear cushioned traction pad, including a view of a coupling device.

In various embodiments, the top surfaces of the front and rear cushioned traction pads 105/110 include artistic design content and writings thereon as shown in FIGS. 4, 5A and 5B.

Figure 2A:
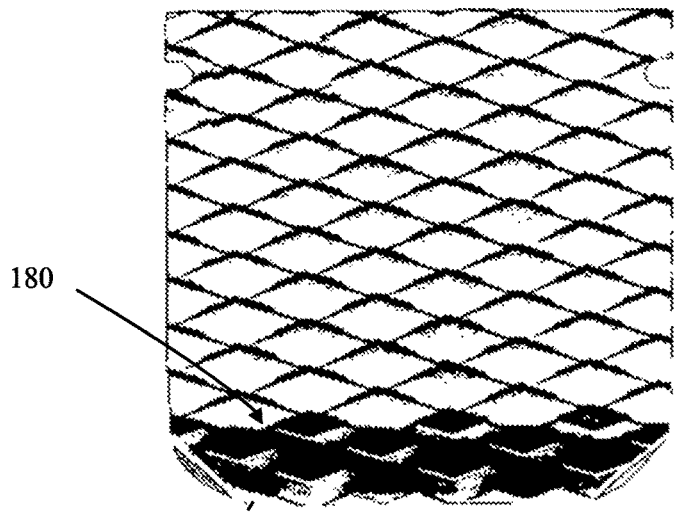
FIG. 2A depicts a rear cushioned traction pad having a kicktail.
Figure 2B:
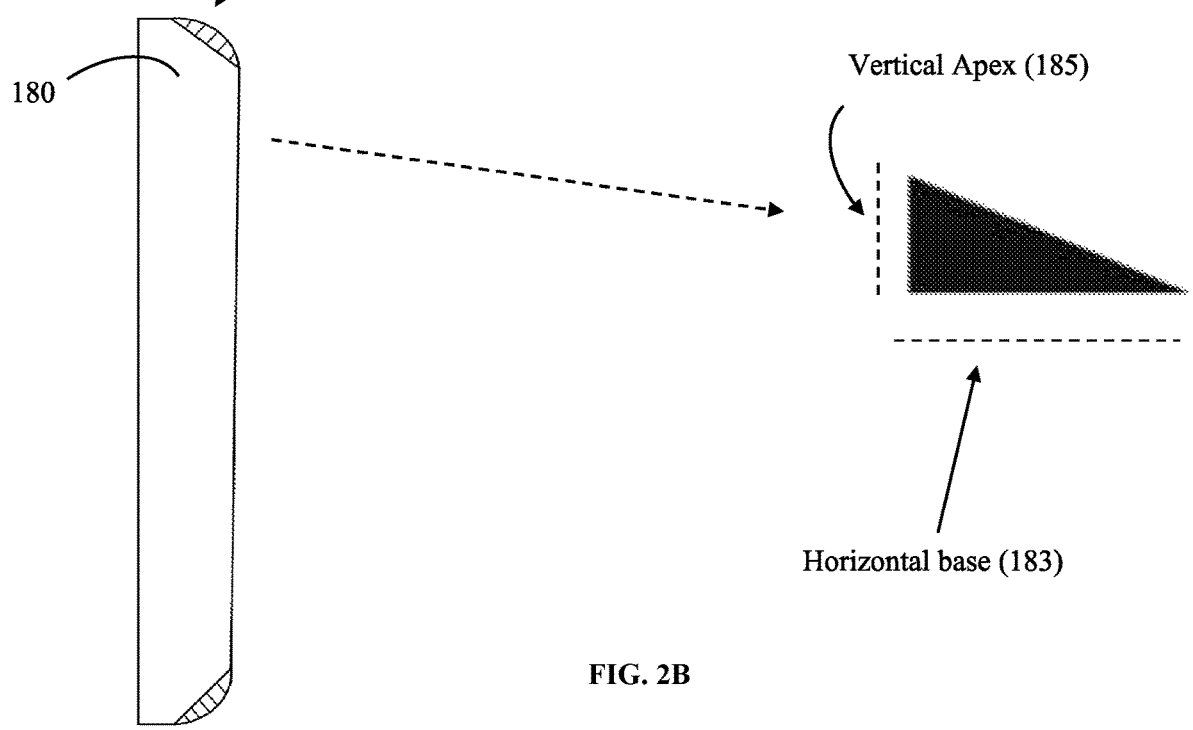
FIG. 2B shows the horizontal base and vertical apex for the kicktail.

Referring to FIGS. 2A-2B, the kicktail 180 (tail) includes a horizontal base 183 and a vertical apex 185. In various embodiments, the length of the horizontal base 183 is in the range of 20 mm to 30 mm, and the height of the vertical apex 185 is in the range of 15 mm to 25 mm. The kicktail will help riders to better maneuver self-balancing vehicles that have at least one wheel 20.

In various embodiments, riders can preselect the length of the horizontal base 188, and the height of the vertical apex 189 of the kicktail depending on their riding needs. For instance, it will be advantageous to allow riders to preselect the type of kicktail they desire because they may want to perform tricks on ONEWHEEL™ vehicles or compete against other riders.

Figure 3A:
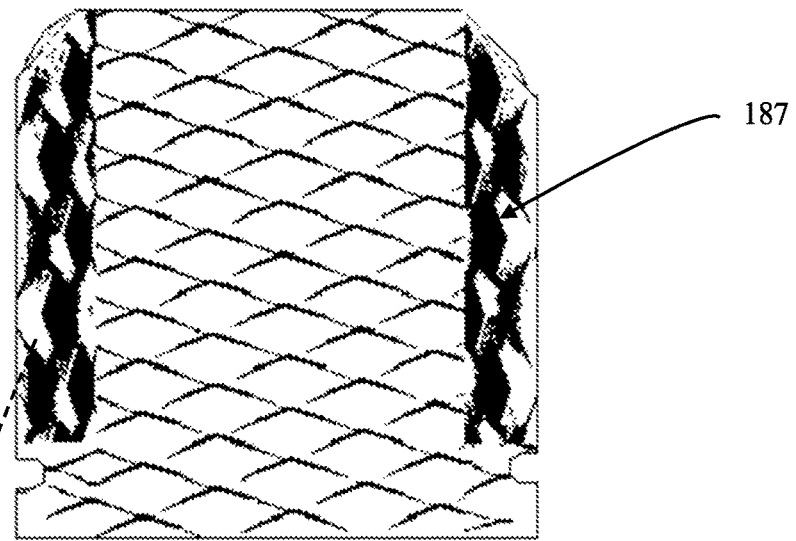
FIG. 3A depicts a front cushioned traction pad having a sidekick.
Figure 3B:
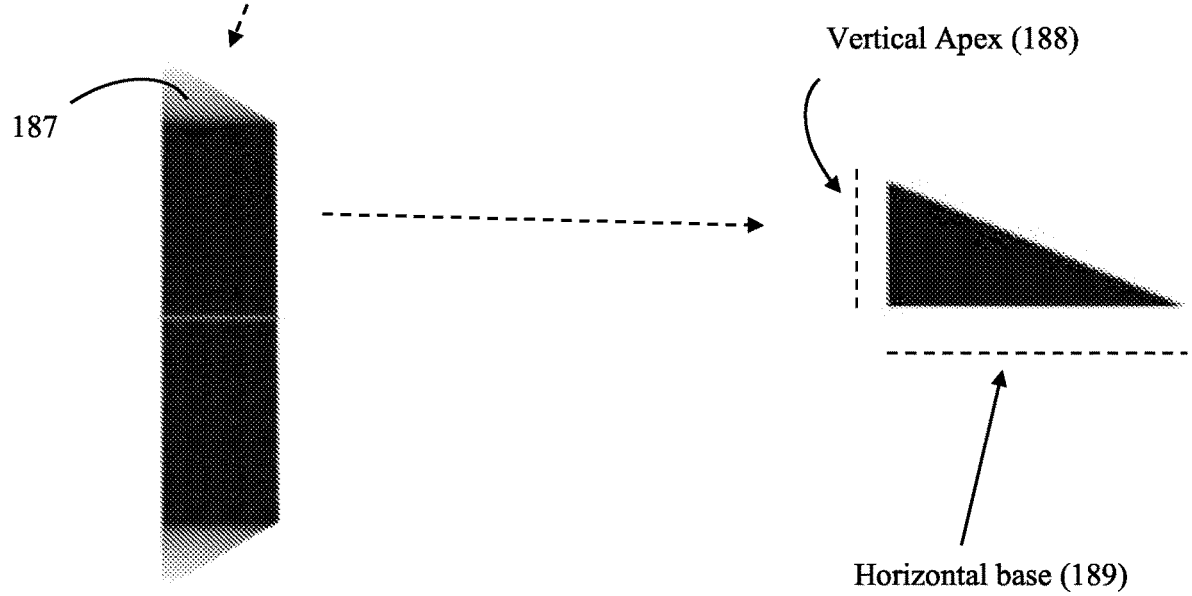
FIG. 3B shows the horizontal base and vertical apex for the sidekick.

In various embodiments, the front cushioned traction pad 105 can include sidekicks (See FIGS. 3A-3B). For this embodiment, riders can preselect the length of the horizontal base 188, and the height of the vertical apex 189 for the sidekicks depending on their riding needs.

Referring to FIGS. 3A-3B, a sidekick 187 includes a horizontal base 188 and a vertical apex 189. The length of the horizontal base 188, and the height of the vertical apex 189 can be preselected by riders depending on their riding needs. The sidekick will help to cradle the front foot of the rider and allow for better riding performance.

In various embodiments, the length of the horizontal base 188 is in the range of 25 mm to 50 mm, and the height of the vertical apex 189 is in the range of 5 mm to 20 mm.

Optionally, the rear traction pad 110 can also include sidekicks. The sidekicks will help to cradle the rear foot of the rider and allow for better riding performance.

In various embodiments, the self-balancing vehicle is an electric/electronic vehicle or it's an electric skateboard having at least one wheel 20 as shown in FIGS. 5A and 6. In other embodiments, the self-balancing vehicle is a one wheeled 20 vehicle.

Figure 8:
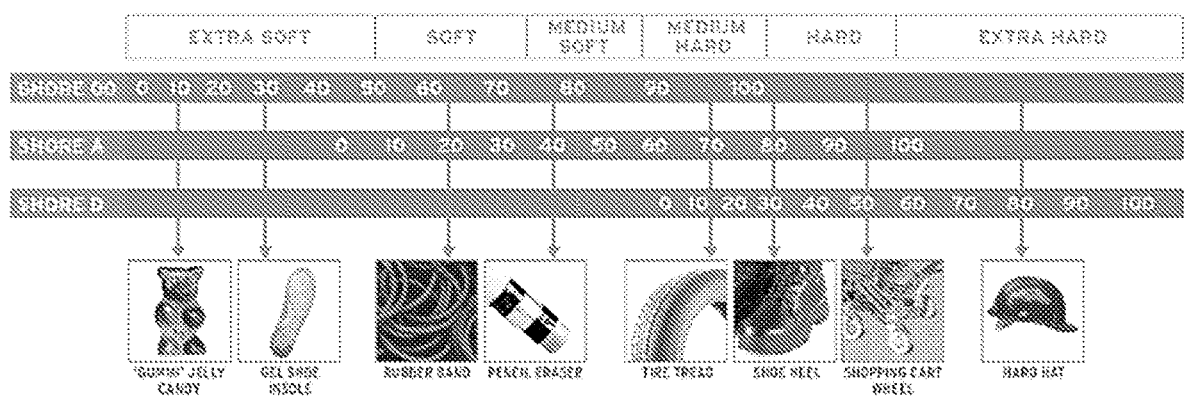
FIG. 8 represents a diagram directed to a shore hardness scale for the friction pads.

In further embodiments, the front and rear cushioned traction pads are comprised of ethylene-vinyl acetate foam (EVA foam). The shore hardness of the EVA foam for the present invention is in the range of 55-65 (Shore 00 scale) as illustrated in FIG. 8. In other embodiments, the shore hardness of the EVA foam is in the range of 55-65 (Shores A and D) or is comprised of all other/inherent shore scales directed to the hardness of the EVA foam.

The shore hardness range of 55-65 is important because it allows the deck portions of the self-balancing vehicle to be adequately cushioned for prolonged riding with or without shoes. This beneficial shore hardness range also allows riders to advantageously ride barefoot especially when riding near a beach, park or trail.

In another embodiment of the present invention, the top surfaces of the front and rear cushioned traction pads 15 include a plurality of protuberances 50 for reducing the rider's slippage. The shape of the protuberances can be circular, triangular, square, pentagonal, hexagonal, diamond or combinations thereof (See also FIGS. 4, 5A and 5B).

Figure 5C:
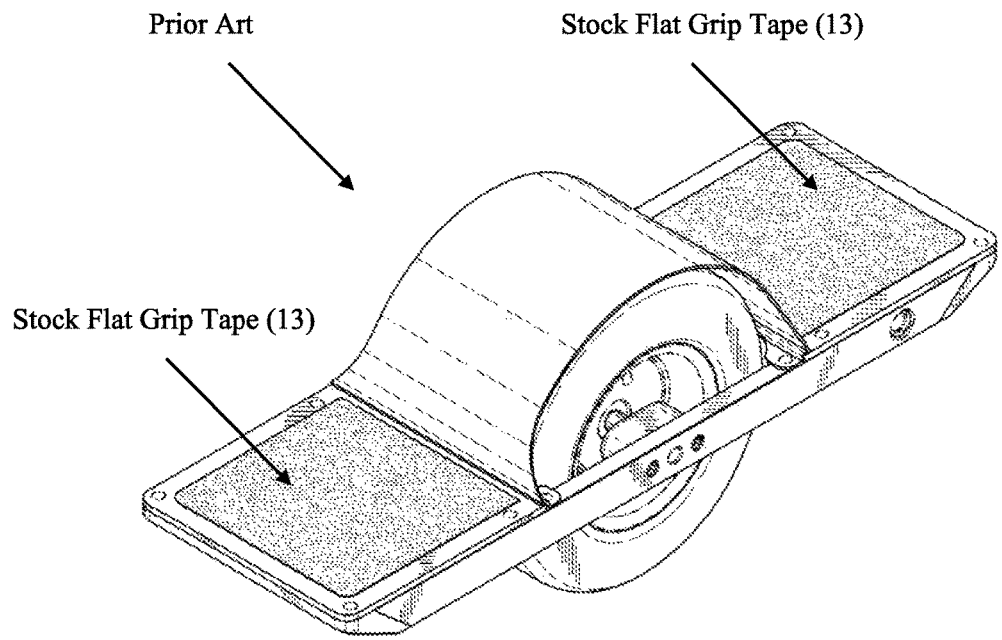
FIG. 5C-D shows the prior art.
Figure 5D:
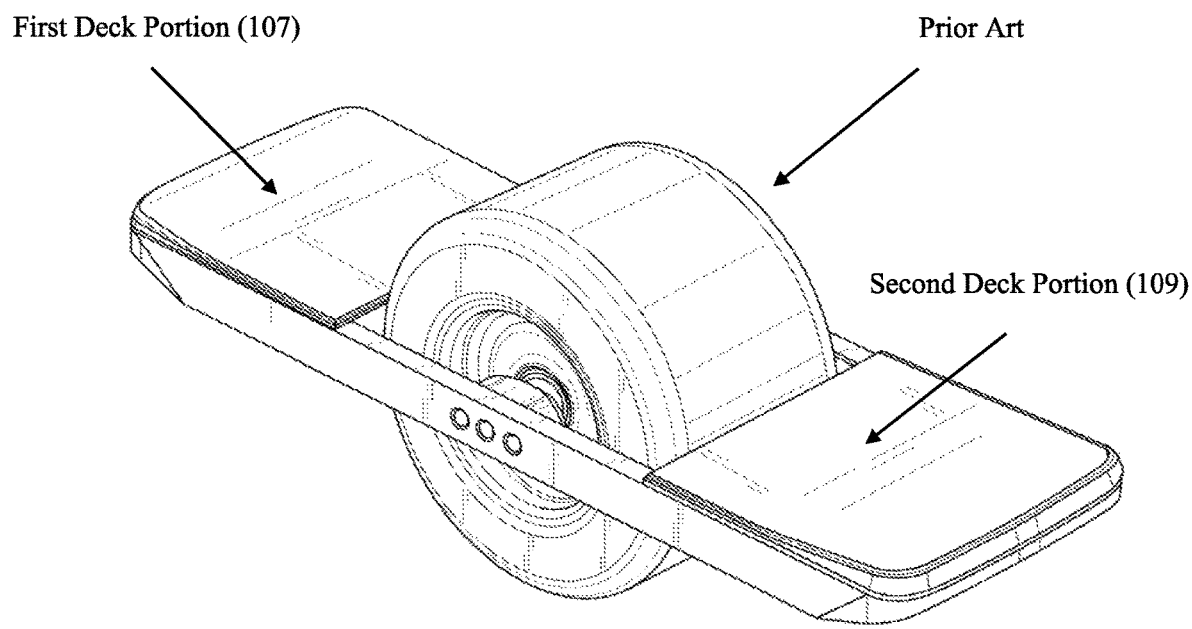

The top surfaces of the friction pads 105/110 have a distinct advantage over traditional stock flat grip tape 13 (See FIG. 5C). For example, the top surface of the cushioned traction pads 105/100 are easier to clean than the flat grip tape 13 since dirt or debris gets embedded into the grainy surface of the flat grip tape. Additionally, a rider can simply wipe the surface of the cushioned friction pads 105/110 clean with their hands or with cloth or a towel.

Figure 7:
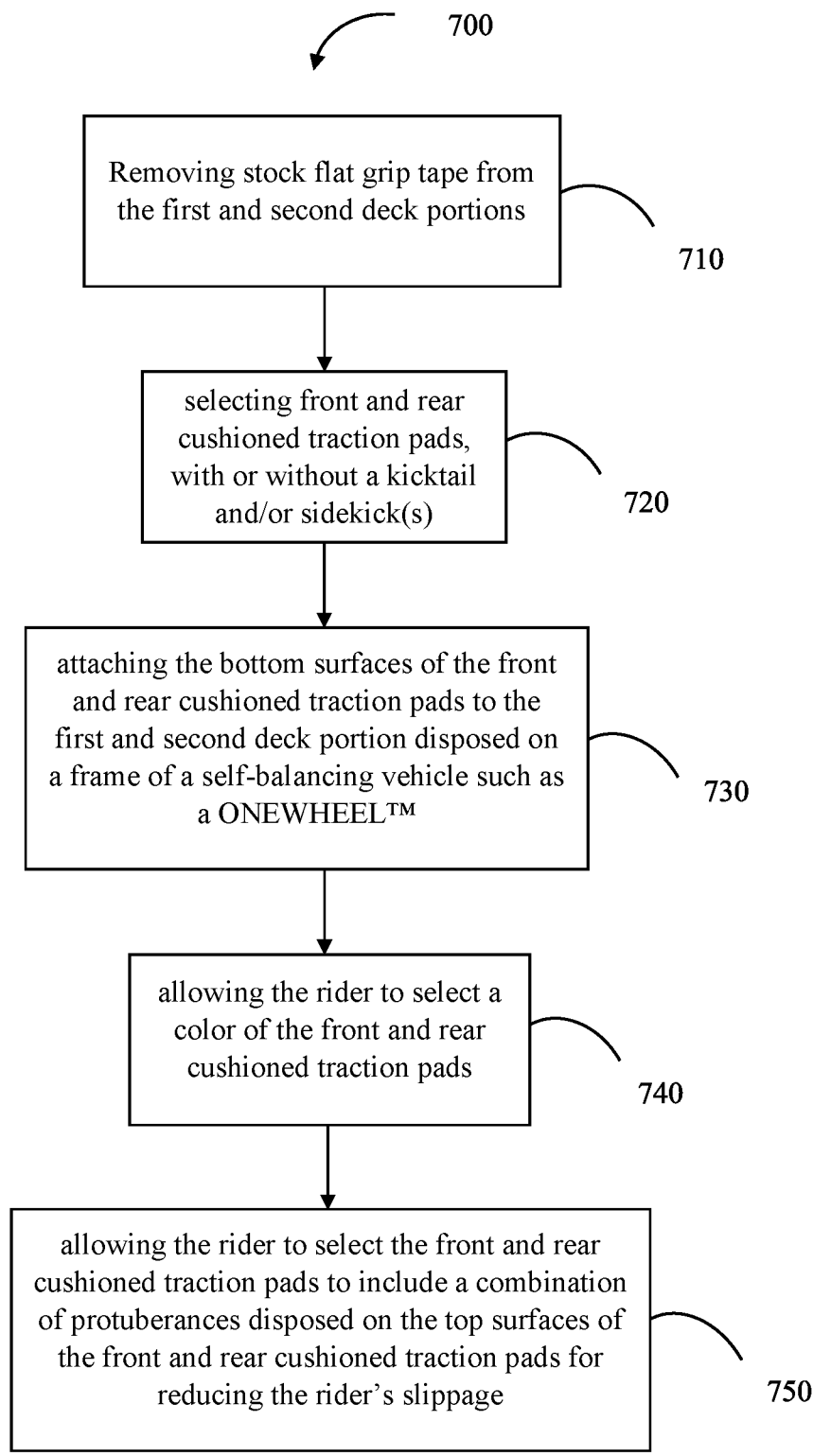
FIG. 7 represents an execution diagram directed to the method of providing cushioned traction pads for self-balancing vehicles.

Referring to FIG. 7, execution diagram 700 shows the process for providing cushioned traction pads for self-balancing vehicles. Starting at block 710, the method includes the step of removing the stock flat grip tape 13 from the first and second deck portions; at 720, selecting a front cushioned traction pad, the front cushioned traction pad having a top surface and a bottom surface; and block 720 includes the step of selecting a rear cushioned traction pad, the rear cushioned traction pad having a top surface and a bottom surface. The top surface of the rear cushioned traction pad includes a rear kicktail extending integrally upwardly and rearwardly.

Referring still to FIG. 7, block 730, includes the step of attaching the bottom surface of the front cushioned traction pad to a first deck portion disposed at a first end of a frame, the top surface of the front cushioned traction pad configured to receive a left or right foot of a rider; and block 730 also includes the step of attaching the bottom surface of the rear cushioned traction pad to a second deck portion disposed at a second end of the frame. The top surface of the rear cushioned traction pad configured to receive the left or right foot of the rider.

Referring still to FIG. 7, block 740, includes the step of allowing the rider to advantageously select a color of the front and rear cushioned traction pads; and block 750 is comprised of the step of allowing the rider to select the front and rear cushioned traction pads to include a combination of protuberances disposed on the top surfaces of the front and rear cushioned traction pads for reducing the rider's slippage.

In various embodiments, the top surfaces of the front and rear cushioned traction pads 105/110 include a plurality of beneficial protuberances. The shape of the protuberances can be circular, triangular, square, pentagonal, hexagonal, diamond or combinations thereof for helping to reduce the rider's slippage.

In other embodiments, the front and rear cushioned traction pads 105/110 are advantageously comprised of ethylene-vinyl acetate foam (EVA foam). The shore hardness of the EVA foam will be in the range of 55-65 (Shore OO scale). In other embodiments, the shore hardness of the EVA foam is in the range of 55-65 (Shores A and D) or is comprised of all other/inherent shore scales directed to the hardness of the EVA foam. The shore hardness range of 55-65 is an important feature because it allows the deck portions of the self-balancing vehicles to be adequately cushioned for prolonged riding with or without shoes. This shore hardness range also allows riders to ride barefoot especially when riding near a beach, park or trail.

Figure 9:
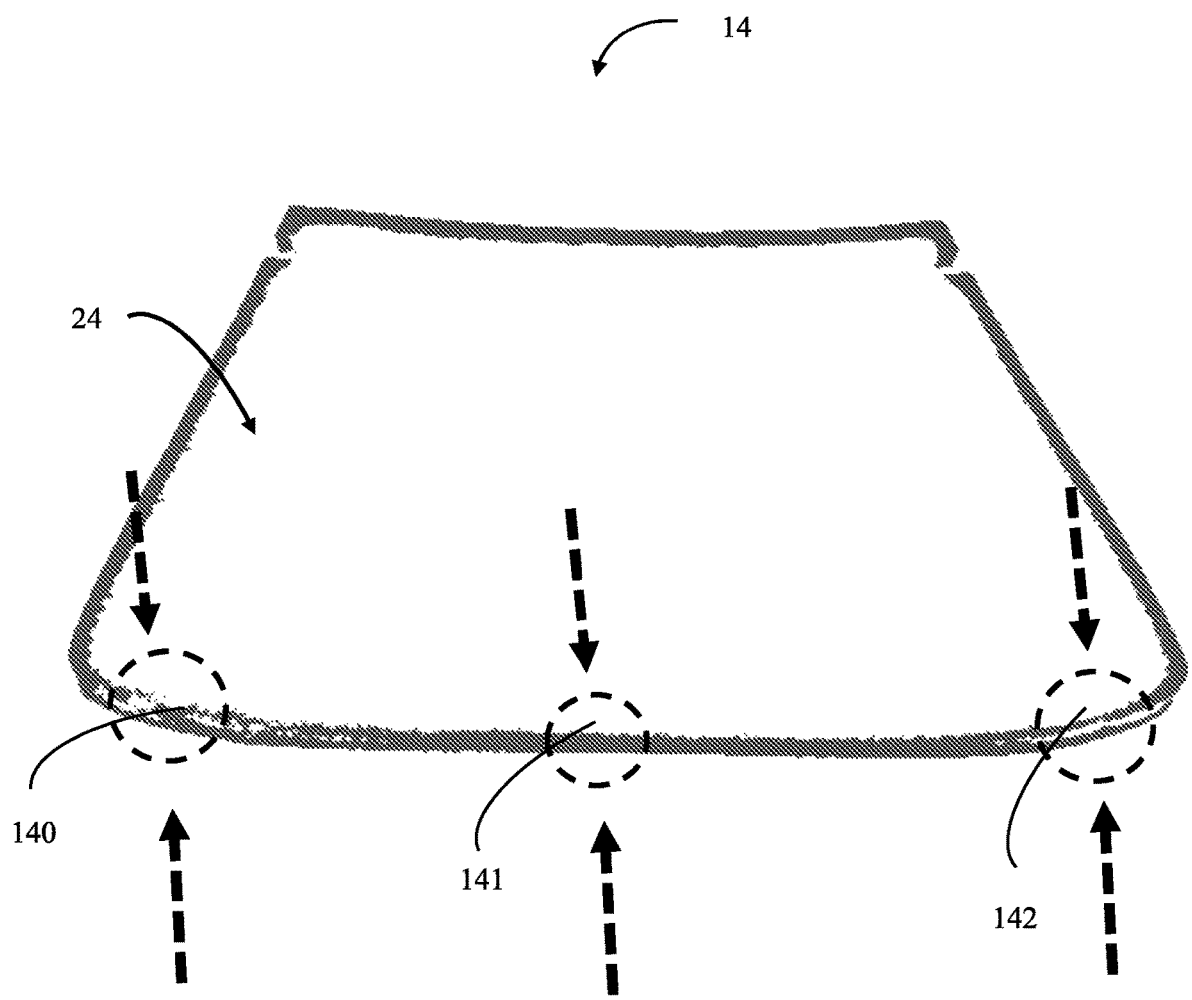
FIG. 9 represents a cushioned concave pad.

Cushioned Concave Pads:

With reference to FIG. 9, one embodiment of the present invention is depicted showing a cushioned concave pad 14 (rectangular shaped having a width and length) for self-balancing vehicles 10 having at least one wheel as represented in FIG. 5A. The cushioned concave pad 14 can be comprised of front and rear cushioned concave pads 106/111 having a top surface 24 and a bottom surface 26 as shown in FIGS. 9, 12, 13, and 14. In this disclosure, the concave pad 14 illustrated in FIG. 9 can represent either front or rear cushioned concave pads.

Figure 10:
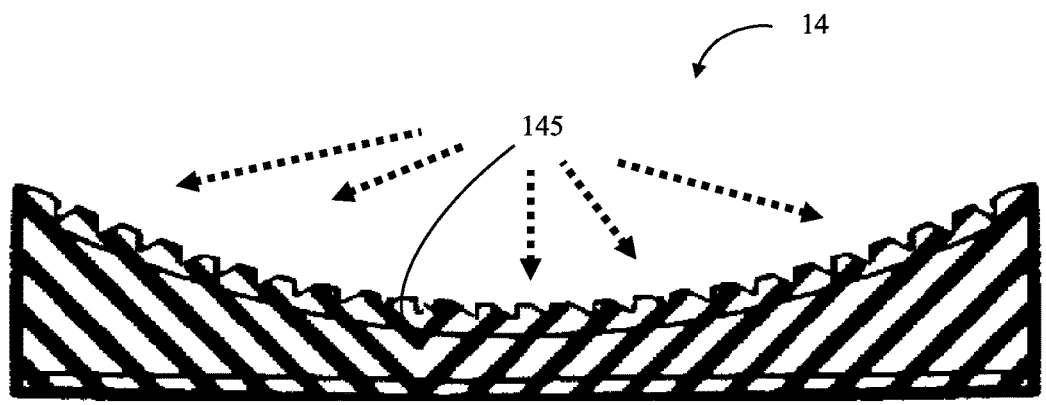
FIGS. 10-11 are side views of a pad illustrating the concave features of said pad.
Figure 11:
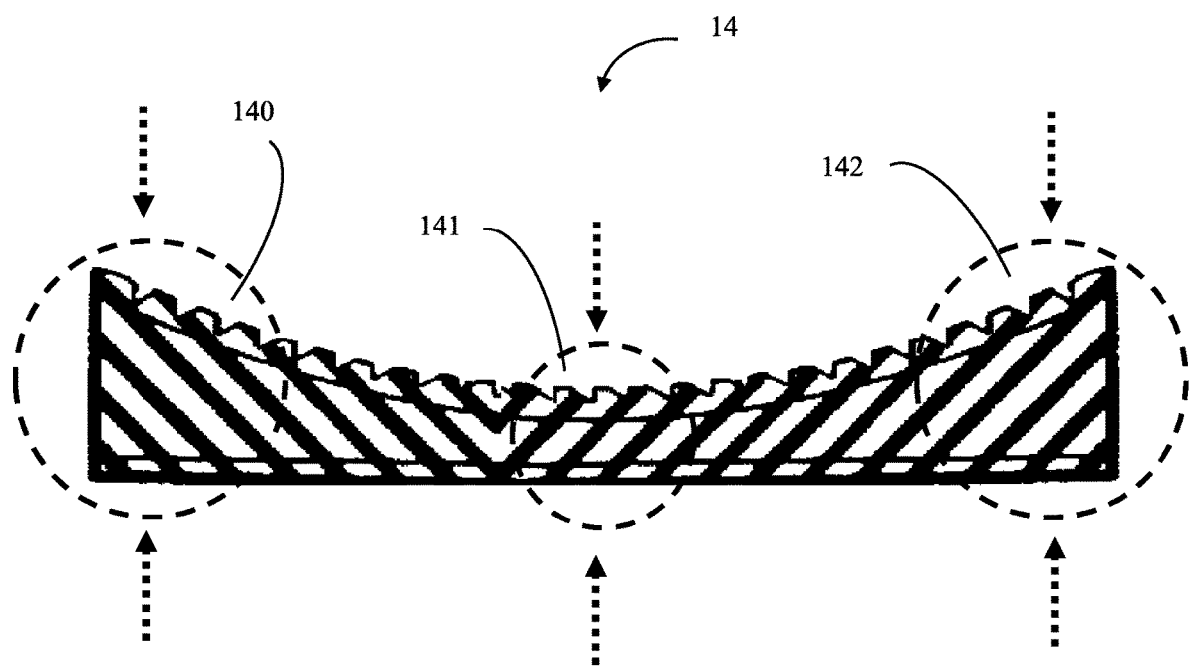

In various embodiments, the bottom surface of the front cushioned concave pad 14 is coupled to a first deck portion 107 disposed at a first end of a frame 32 (See FIGS. 6A-6C). The front cushioned concave pad 14 also includes a frontal end and a posterior end (See FIGS. 1B-1C representing similar parameters) and the top surface of the front cushioned concave pad is also comprised of a beneficial concave shaped surface 145 as shown in FIGS. 9-11.

In another embodiment, the bottom surface of the rear cushioned concave pad 14 is coupled to a second deck portion 109 disposed at a second end of the frame 34 (See FIGS. 6A-6C). The rear cushioned concave pad 14 further includes a frontal end and a posterior end (See FIGS. 1B-1C representing similar parameters) and the top surface of the rear cushion pad is comprised of a beneficial concave shaped surface 145 as shown in FIGS. 9-11.

Figure 12:
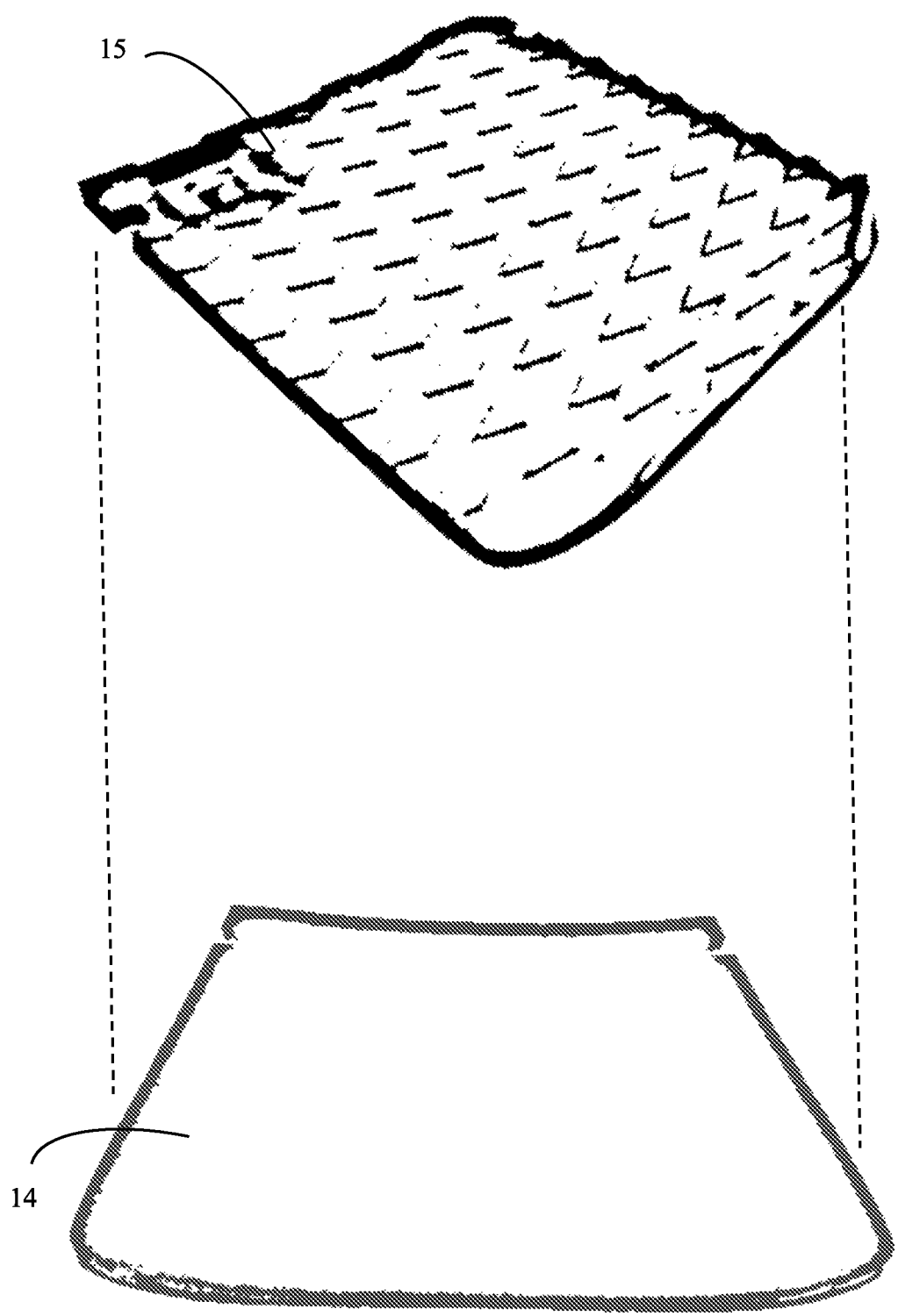
FIG. 12 represents a cushioned traction pad being placed on the top surface of the cushioned concave pad.
Figure 13A:
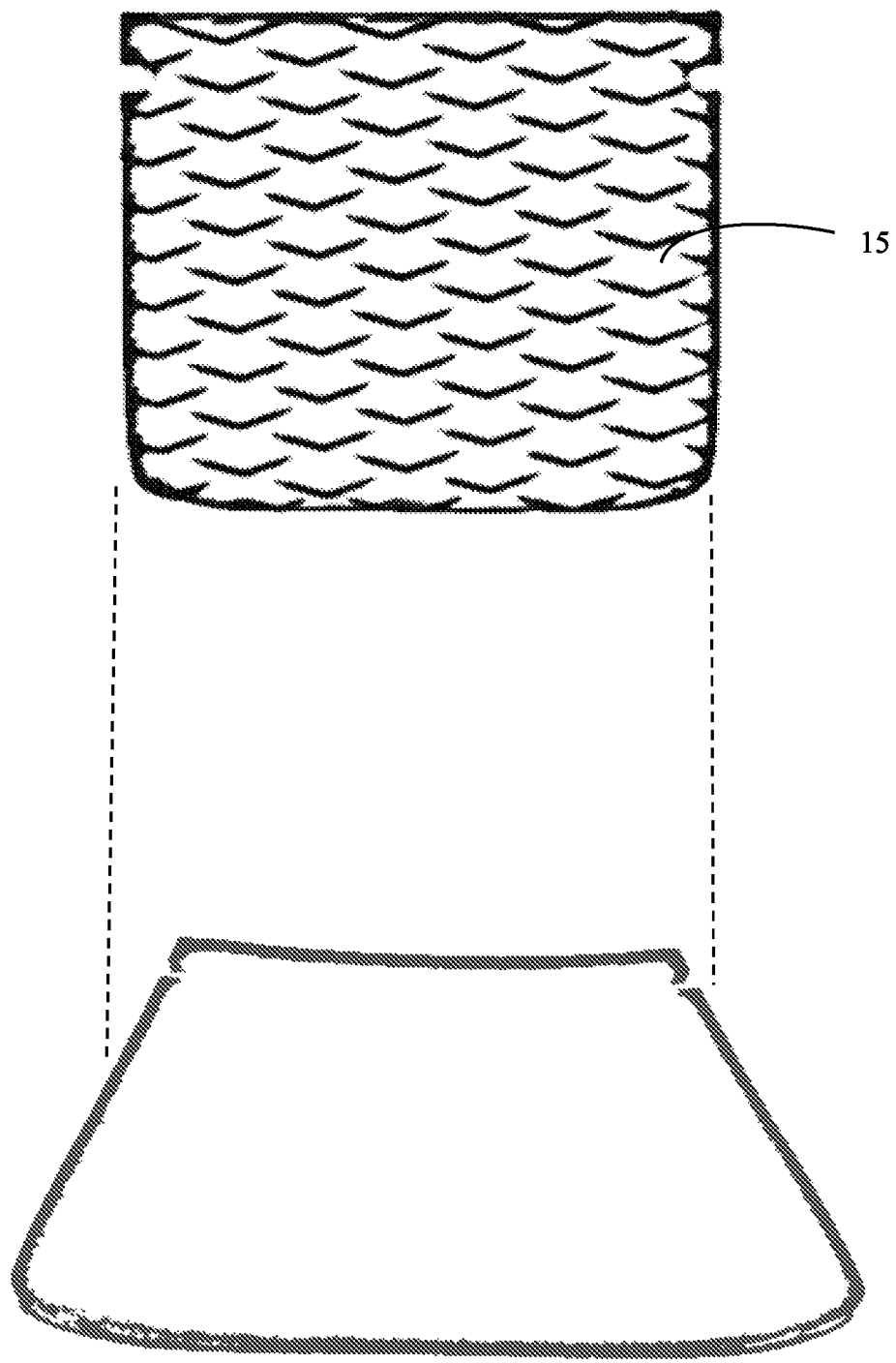
FIG. 13A represents another embodiment of a cushioned traction pad being placed on the top surface of the cushioned concave pad.
Figure 13B:
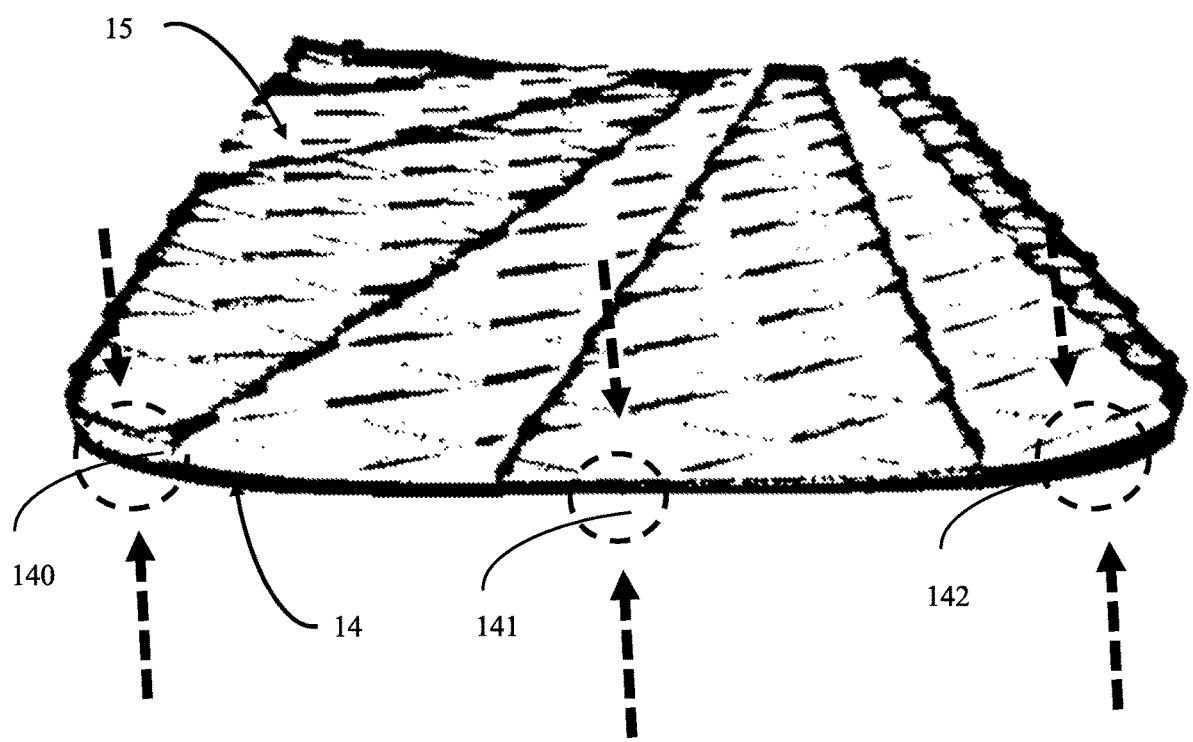
FIG. 13B shows the combination represented in FIG. 13A.
Figure 14A:
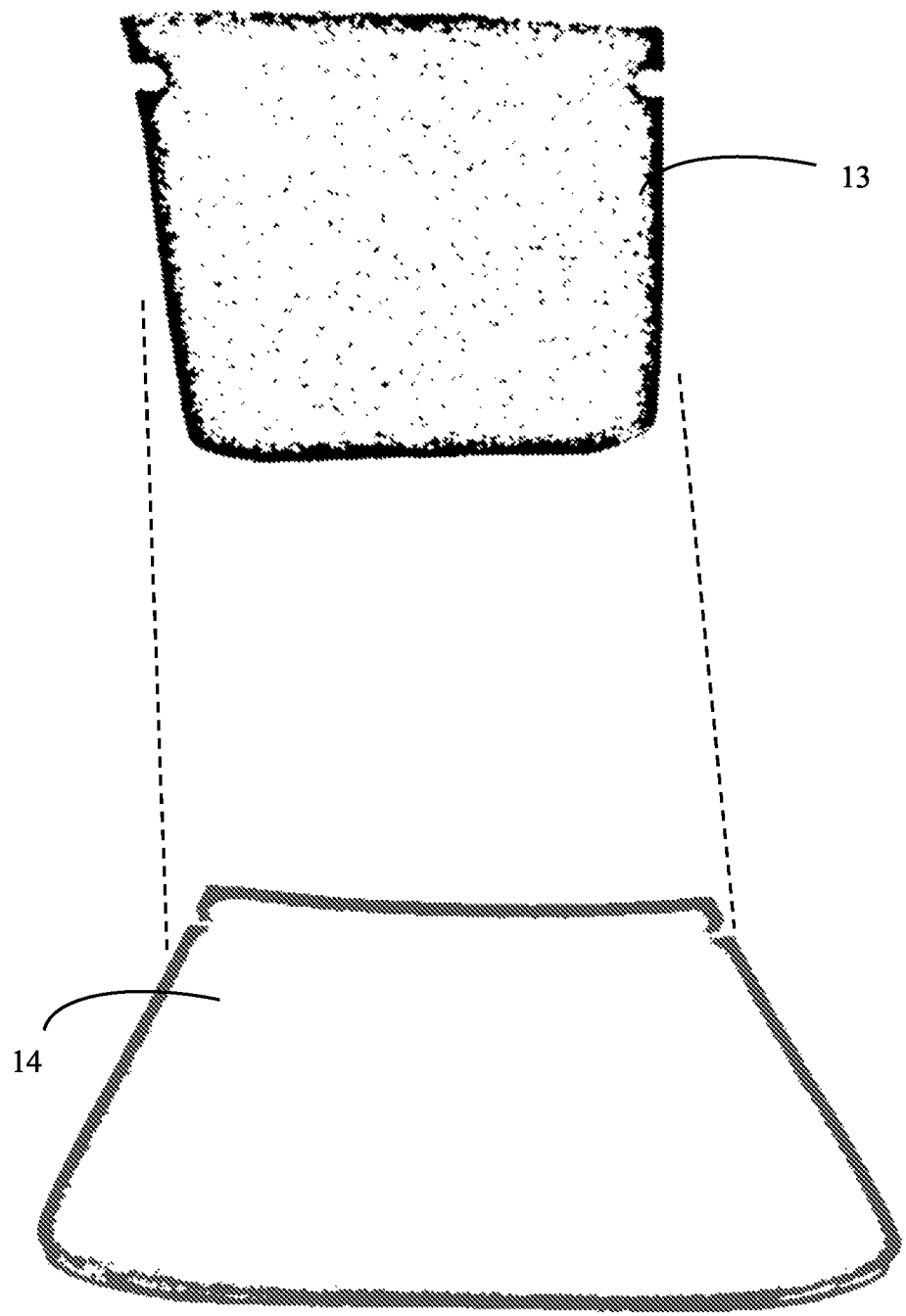
FIG. 14A represents a piece of flat grip tape being placed on the top surface of the cushioned concave pad.
Figure 14B:
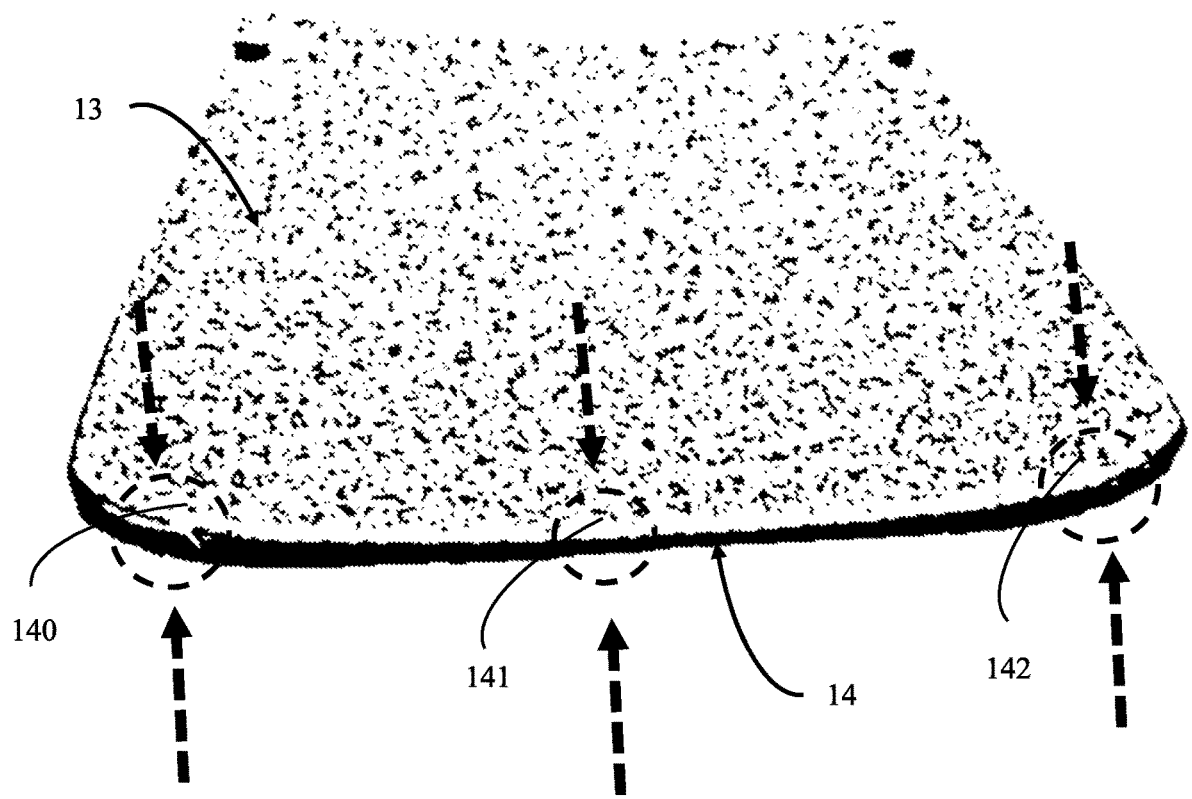
FIG. 14B shows the combination represented in FIG. 14A.
Figure 14C:
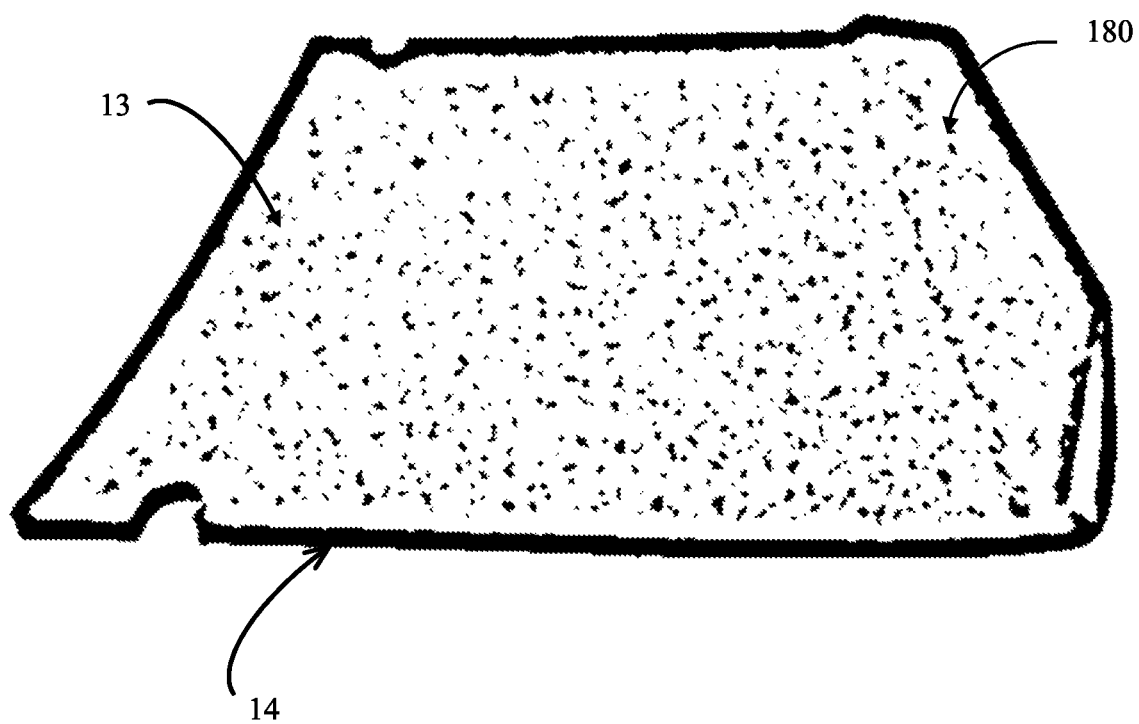
FIG. 14C shows the combination represented in FIGS. 14A and 14B, including a kicktail coupled to the top surface of the cushioned concave pad.

Referring now to FIGS. 12-14, a front cushioned traction pad 15/105 or a front piece of flat grip tape 13/108 is coupled to the top surface of the front cushioned pad 14. The top surface of the front cushioned traction pad 15/105 or a top surface of the front piece of flat grip tape 13 receives or takes on the concave shape of the front cushioned pad 14 when placed thereon (See FIGS. 13B and 14B).

Referring still to FIGS. 12-14, a rear cushioned traction pad 15/110 or a rear piece of flat grip tape 13/113 is coupled to the top surface of the rear cushioned pad 14. The top surface of the rear cushioned traction pad 15/110 or a top surface of the rear piece of flat grip tape 13 receives or takes on the concave shape of the rear cushioned pad 13 when placed thereon. In this disclosure, the grip tape 13 illustrated in FIG. 14 can represent either front or rear grip tape 13. (See FIGS. 13B and 14B).

Figure 16A:
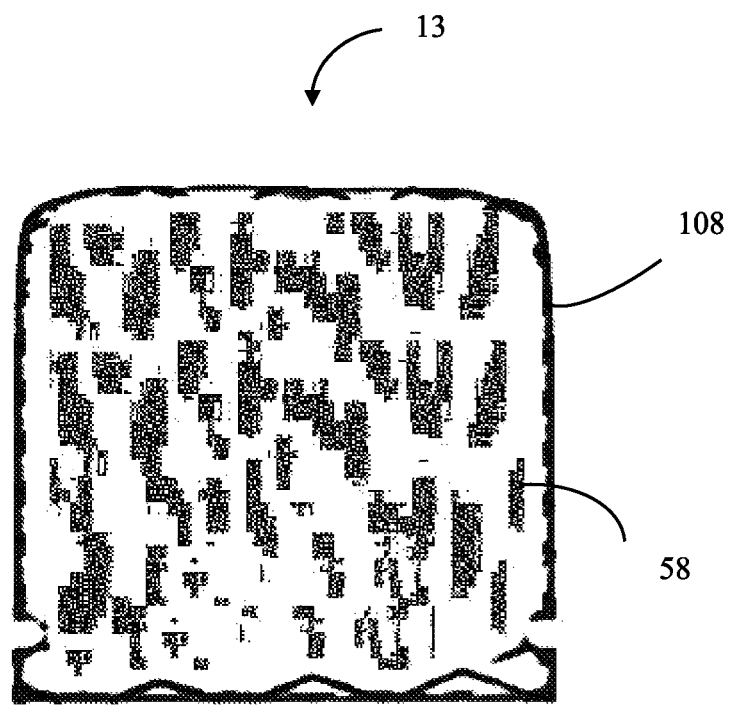
FIGS. 16A and 16B show the bottom surface of flat grip tape.
Figure 16B:
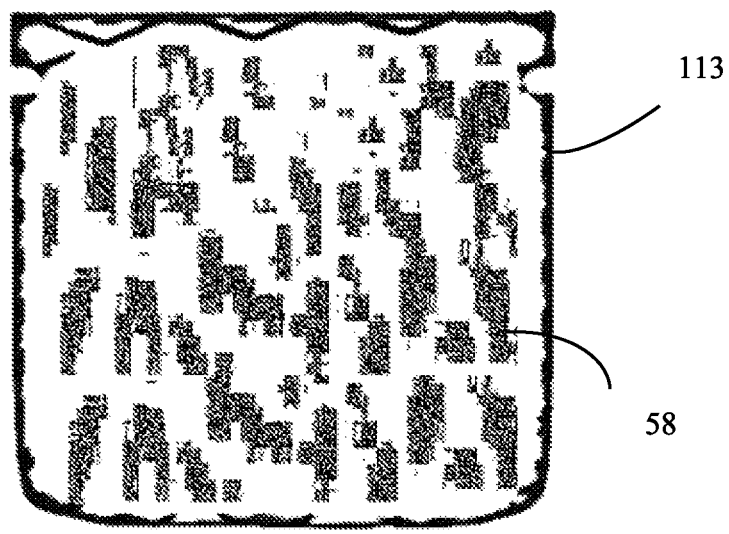

In various embodiments, the grip tape 13 is comprised of special course 30/60 grit grip tape surface and the bottom surface of the grit tape includes an adhesive 58 (See FIGS. 16A-16B).

In another embodiment of the present invention, the front cushioned concave pad 14 is disposed fore of a single wheel and the rear cushioned concave pad 14 is disposed aft of the single wheel. In various embodiments, the single wheel is substantially coupled to a middle section of the frame as shown in FIG. 5A. Also, a first space is disposed between the single wheel and the posterior end of the front cushioned pad and a second space is disposed between the single wheel and the posterior end of the rear cushioned pad which enables the single wheel to rotate when the self-balancing vehicle is in use (See FIGS. 1B-1C representing similar parameters).

In a further embodiment of the present invention, the front and rear cushioned concave pads 14 are comprised of ethylene-vinyl acetate foam (EVA foam). Moreover, the shore hardness of the EVA foam is in the range of 40 to 65.

As shown in FIGS. 9-11, the concave shaped surface of the front and rear cushioned pads 14 includes first and second end points 140/142 and a center point 141. The height of the first and second end points are in the range of 5-10 mm and the height of the center point is in the range of 1-5 mm. The parameters of the center and end points form the beneficial concave shape 145 that is disposed on the top surface of the front and rear cushioned concave pads 14.

In one embodiment, the cushioned concave pads 14 are advantageously comprised of one-piece (unitary) EVA foam having a shore hardness range of 40-65 with a heel to toe concave shape on the top surfaces (See FIG. 9). The top surfaces of the cushioned concave pads 14 have first and second ends points 140/142 each having a height in the range of 5-10 mm as illustrated in FIGS. 9-11. The top surfaces of the cushioned concave pads 14 also have a center point 141 having a height in the range of 1-5 mm (See FIGS. 9-11).

In other embodiments, the one-piece concave pads 14 include 3M™ adhesive 56 lined on the bottom for attaching/coupling to front or rear foot pads of a ONEWEEL™. Ideally the user (rider) would subsequently select either PRORIDE™ traction pad(s) or flat grip tape to be coupled/attached to the top surfaces of the cushioned concave pads 14.

In various embodiments, the top surface of the rear cushioned traction pad 15/110 includes a rear kicktail 180 extending integrally upwardly and rearwardly. The kicktail further includes a horizontal base 183 and a vertical apex 185. The length of the horizontal base is in the range of 20 mm to 30 mm, and the height of the vertical apex is in the range of 15 mm to 25 mm. Additionally, the rear kicktail includes beveled corners to provide further riding support for the user.

Figure 15A:
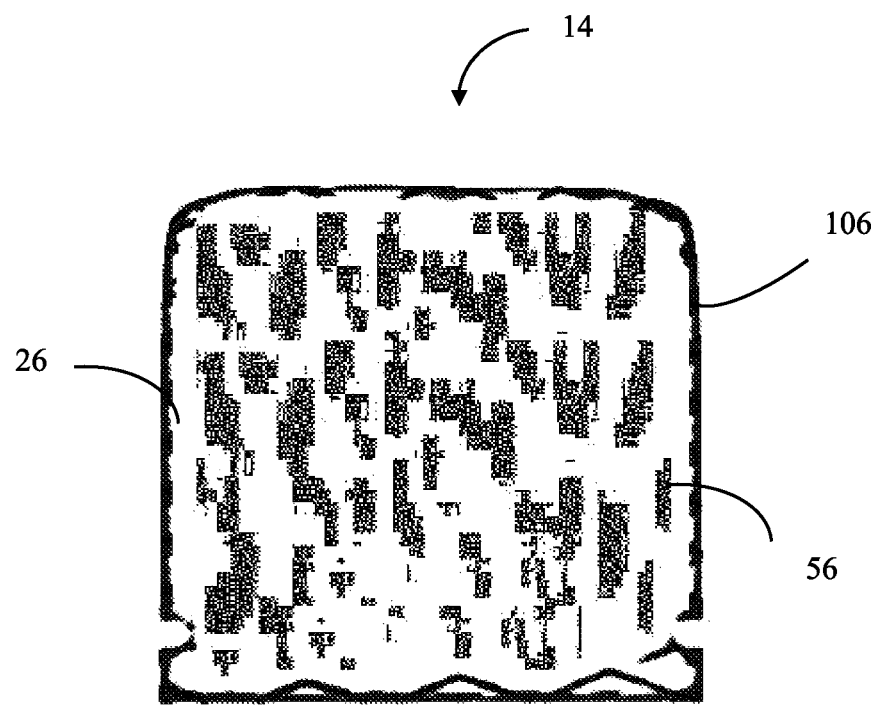
FIGS. 15A and 15B show the bottom surface of the cushioned concave pads.
Figure 15B:
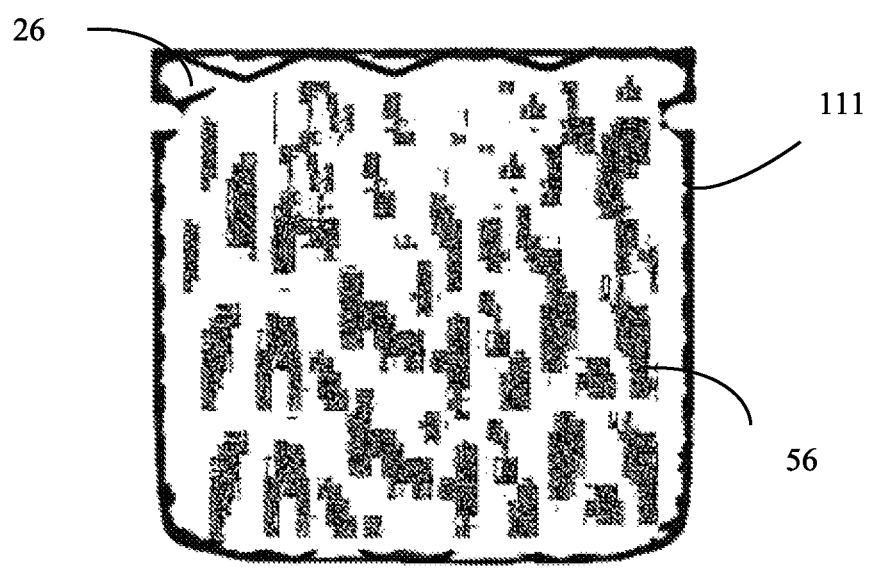

In a further embodiment of the present invention, the bottom surfaces of the front and rear cushioned concave pads 14 include an adhesive 56 disposed thereon (See FIGS. 15A-15B). The adhesive is comprised of double coated tissue tape that allows the cushioned pads 14 to adhere to bottom surfaces of the first and second deck portions 32/34 (See FIG. 6C).

In use, the cushioned concave pads 14 create a cushioned saddle for a user's heel and toes which allows the user (rider) to have better control especially in turns while also offering comfort to relieve foot fatigue. Basically, the pads 14 provide more leverage to the feet of a rider with the intent that the pads can be combined with the choice of traction pads 15 or grip tape 13. Optionally, the rear pads could be available with a kicktail if the user choses the grip tape 13 option.

Optionally, a user (rider) can select to add a kicktail to a cushioned concave pad 14 if he or she selects to use grip tape 13. In this embodiment, the kicktail 180 is a separate piece of foam that is securely attached/coupled to the concave pad 14 (See FIG. 14C).

Figure 17:
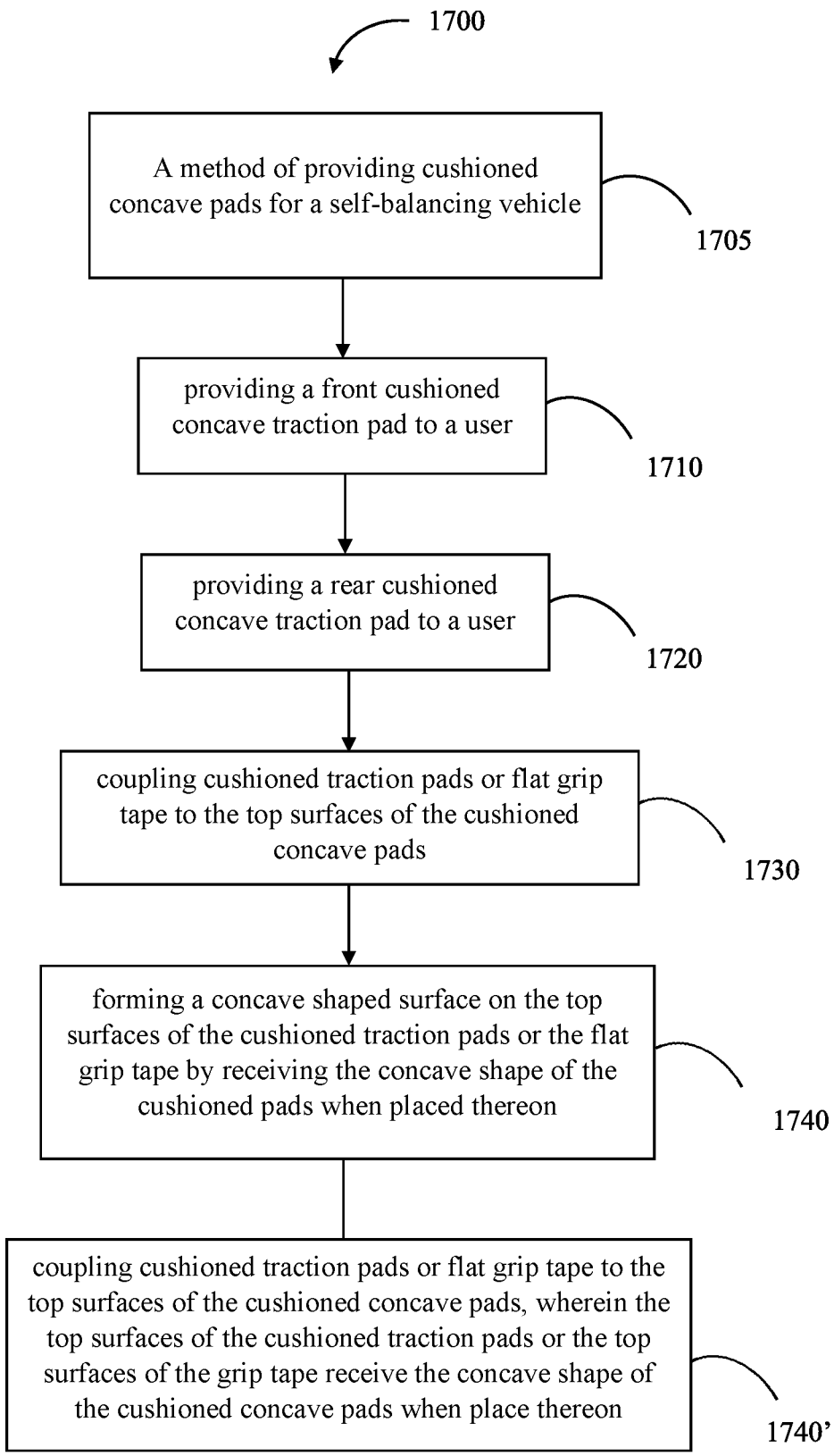
FIG. 17 represents an execution diagram directed to the method of providing cushioned concave pads for self-balancing vehicles.

Referring to FIG. 17, execution diagram 1700 shows the process for providing at least one cushioned concave pad for self-balancing vehicles. Starting at block 1710, the method includes the step of providing a front cushioned concave pad to a user; at block 1720, providing a rear cushioned concave pad to the user; at block 1730, coupling a front cushioned traction pad or a front piece of flat grip tape to the top surfaces of the cushioned concave pads; and at block 1740, forming a concave shaped surface on the top surfaces of the cushioned traction pad or the piece of grip tape by receiving the concave shape of the cushioned pads when placed thereon. Optionally, at block 1740, the method includes the step of coupling cushioned traction pads or a grip tape to the top surfaces of the front and rear cushioned pads. The top surface of the cushioned traction pads or a top surface of the grip tape advantageously receives the concave shape 145 of the front cushioned pad when placed thereon as shown in FIGS. 10-11.

Referring still to FIG. 17, the front cushioned concave pad is disposed fore of a single wheel and the rear cushioned concave pad is disposed aft of the single wheel. The single wheel is substantially coupled to a middle section of the frame. A first space is disposed between the single wheel and the posterior end of the front cushioned pad, and a second space is disposed between the single wheel and the posterior end of the rear cushioned pad for allowing the single wheel to rotate when in use.

Figure 18:
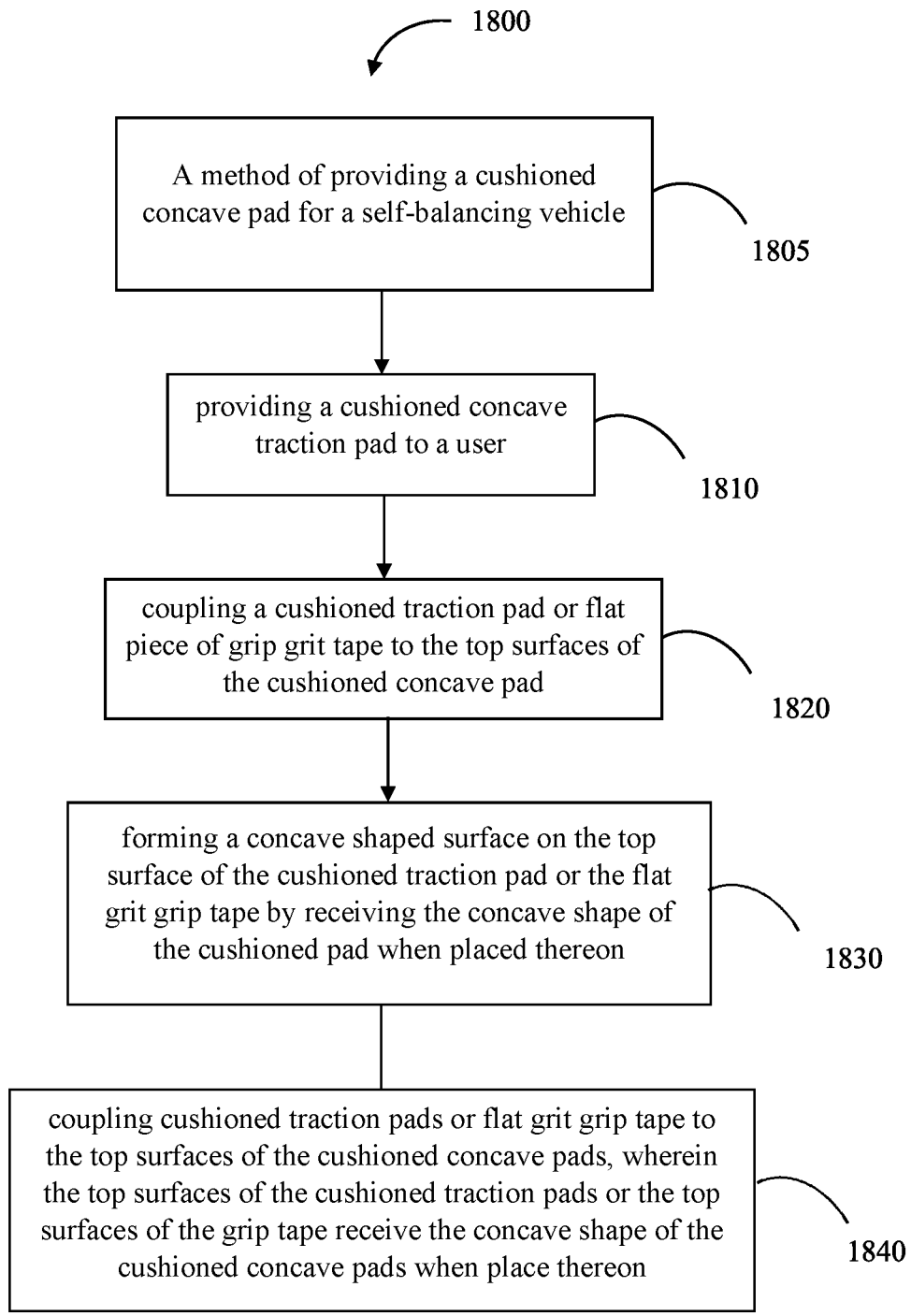
FIG. 18 represents execution diagram directed to the method of providing a cushioned concave pad for self-balancing vehicles.

Referring to FIG. 18, execution diagram 1800 shows the process for providing at least one cushioned concave pad for self-balancing vehicles. Starting at block 1810, the method includes the step of providing a cushioned concave pad to a user; at block 1820 coupling the cushioned traction pad or the flat grip tape to the top surfaces of the cushioned concave pad; and at block 1830, forming a concave shaped surface on the top surfaces of the cushioned traction pad or the piece of grip tape by receiving the concave shape of the cushioned pad when placed thereon. Optionally, at block 1840, the method includes the step of coupling a cushioned traction pas or a piece of grip tape to the top surfaces of cushioned pad. The top surface of the cushioned traction pads or a top surface of the grip tape advantageously receives the concave shape 145 of the cushioned pad when placed thereon as shown in FIGS. 13B and 14B.

As displayed in FIGS. 13B and 14B, the concave shaped surface of the cushioned traction pad 15 or grip tape 13 include first and second end points 140/142 and a center point 141. The height of the first and second end points are approximately in the range of 5-10 mm and the height of the center point is approximately in the range of 1-5 mm. The parameters of the center and end points form the beneficial concave shape 145 that is substantially disposed on the top surface of the cushioned traction pad 15 or the grit grip tape 13.

INDUSTRIAL APPLICABILITY

The present invention pertains to cushioned traction pads and cushioned pads for self-balancing vehicles having at least one wheel, which may be of value or importance to various industries, such as the skateboard, and the electronic/electrical transport industry.

What is claimed is:

1. A method of providing at least one cushioned traction pad for a single-wheeled self-balancing vehicle, said method comprising:
    providing a rear cushioned traction pad to a user, the rear cushioned traction pad having a top surface, a bottom surface, a frontal end, and a posterior end, wherein the bottom surface of the rear cushioned traction pad is coupled to a rear deck portion disposed at a rear end of a frame, wherein the top surface of the rear cushioned traction pad includes an area consisting of a single, uniform plane that receives the left or right foot of the user and accommodates the left or right foot of the user from heel to toe;
    the rear cushioned traction pad further having a combination of protuberances disposed on the top surface thereon for reducing the user's slippage while riding the single-wheeled self-balancing vehicle;
    the single-wheeled self-balancing vehicle having a single wheel coupled to a middle section of the frame,
    wherein the rear cushioned traction pad is disposed aft of the single wheel and wherein a rear space is disposed between the single wheel and the posterior end of the rear cushioned traction pad, thereby enabling the single wheel to rotate when in use; and
    the top surface of the rear cushioned traction pad having a rear kicktail extending integrally upwardly and rearwardly, wherein the kicktail further includes a horizontal base and a vertical apex and wherein the length of the horizontal base is in the range of 20 mm to 30 mm, and the height of the vertical apex is in the range of 5 mm to 25 mm.

2. The method of claim 1, wherein the shape of the protuberances is circular, triangular, square, pentagonal, hexagonal, or diamond.

3. The method of claim 1, wherein the rear cushioned traction pad is comprised of ethylene-vinyl acetate foam (EVA foam), and wherein a shore hardness of the EVA foam is in the range of 55 to 65.

4. The method of claim 1, wherein the rear kicktail includes beveled corners, thereby providing further riding support for the user.

5. The method of claim 1, wherein the bottom surfaces of the rear cushioned traction pad includes an adhesive disposed thereon, wherein the adhesive is comprised of double coated tissue tape, thereby enabling the rear cushioned traction pad to adhere to the top surface of the rear deck portion.

6. The method of claim 1 further comprising the steps of:
    providing a front cushioned traction pad to the user, the front cushioned traction pad having a top surface, a bottom surface, a frontal end, and a posterior end, wherein the bottom surface of the front cushioned traction pad is coupled to a front deck portion disposed at a front end of the frame and wherein the top surface of the front cushioned traction pad receives the left or right foot of the user.

7. A method of attaching at least one cushioned traction pad to a single-wheeled self-balancing vehicle, said method comprising:
    attaching a rear cushioned traction pad to a single-wheeled, self-balancing vehicle, the rear cushioned traction pad having a top surface, a bottom surface, a frontal end, and a posterior end, wherein the bottom surface of the rear cushioned traction pad is coupled to a rear deck portion disposed at a rear end of a frame, wherein the top surface of the rear cushioned traction pad includes an area consisting of a single, uniform plane that receives the left or right foot of a user and accommodates the left or right foot of the user from heel to toe;
    the rear cushioned traction pad further having a combination of protuberances disposed on the top surface thereon for reducing the user's slippage while riding the single-wheeled self-balancing vehicle;
    the single-wheeled self-balancing vehicle having a single wheel coupled to a middle section of the frame,
    wherein the rear cushioned traction pad is disposed aft of the single wheel and wherein a rear space is disposed between the single wheel and the posterior end of the rear cushioned traction pad, thereby enabling the single wheel to rotate when in use;
    the top surface of the rear cushioned traction pad having a rear kicktail extending integrally upwardly and rearwardly, wherein the kicktail further includes a horizontal base and a vertical apex and wherein the length of the horizontal base is in the range of 20 mm to 30 mm, and the height of the vertical apex is in the range of 5 mm to 25 mm.

8. The method of claim 7 further comprising the steps of:
    attaching a front cushioned traction pad to the single-wheeled self-balancing vehicle, the front cushioned traction pad having a top surface and a bottom surface, wherein the bottom surface of the front cushioned traction pad is coupled to a front deck portion disposed at a front end of the frame.

9. The method of claim 7, wherein the shape of the protuberances is circular, triangular, square, pentagonal, hexagonal, or diamond.

10. The method of claim 7, wherein the rear cushioned traction pad is comprised of ethylene-vinyl acetate foam (EVA foam), and wherein a shore hardness of the EVA foam is in the range of 55 to 65.

11. The method of claim 7, wherein the rear kicktail includes beveled corners, thereby providing further riding support for the user.

* * * * *